(12) United States Patent
Mo et al.

(10) Patent No.: US 10,637,728 B2
(45) Date of Patent: Apr. 28, 2020

(54) CONFIGURATION METHOD AND APPARATUS

(71) Applicant: Huawei Technologies Co., Ltd., Shenzhen (CN)

(72) Inventors: Taofu Mo, Chengdu (CN); Bo Han, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/003,652

(22) Filed: Jun. 8, 2018

(65) Prior Publication Data

US 2018/0295020 A1 Oct. 11, 2018

Related U.S. Application Data

(63) Continuation of application No. PCT/CN2016/100200, filed on Sep. 26, 2016.

(30) Foreign Application Priority Data

Dec. 11, 2015 (CN) .......................... 2015 1 0925926

(51) Int. Cl.
*H04W 72/04* (2009.01)
*H04L 12/24* (2006.01)
(Continued)

(52) U.S. Cl.
CPC ........ *H04L 41/0806* (2013.01); *H04L 5/0035* (2013.01); *H04L 5/0037* (2013.01);
(Continued)

(58) Field of Classification Search
CPC ..... H04W 72/04; H04W 72/08; H04W 16/24; H04W 72/0453; H04W 72/082; H04L 12/24; H04L 5/14; H04L 41/0806
See application file for complete search history.

(56) References Cited

U.S. PATENT DOCUMENTS

| 2006/0205412 A1* | 9/2006 | Oh ......................... H04W 16/02 455/450 |
| 2009/0279505 A1* | 11/2009 | Baek ..................... H04W 16/06 370/331 |

(Continued)

FOREIGN PATENT DOCUMENTS

| CN | 101820682 A | 9/2010 |
| CN | 103209415 A | 7/2013 |

(Continued)

*Primary Examiner* — Chi Ho A Lee
(74) *Attorney, Agent, or Firm* — Leydig, Voit & Mayer, Ltd.

(57) ABSTRACT

Embodiments of the present disclosure provide a method and apparatus, and relate to the field of communications technologies. The method provided in the embodiments of the present disclosure is applied to a full-duplex system, and includes: dividing, by a base station, user equipments in a first cell into N user groups, where N is a positive integer greater than or equal to 2; and configuring, by the base station for user equipment in each of the N user groups, an uplink frequency band used for uplink transmission and a downlink frequency band used for downlink receiving, where the uplink frequency band is different from the downlink frequency band in a same user group, and the uplink frequency band and the downlink frequency band are frequency sub-bands of an operating frequency band of the full-duplex system. According to the embodiments of the present disclosure, interference between user equipments is reduced.

20 Claims, 13 Drawing Sheets

(51) Int. Cl.
   *H04W 16/14* (2009.01)
   *H04L 5/14* (2006.01)
   *H04L 5/00* (2006.01)
   *H04W 16/24* (2009.01)
   *H04W 72/08* (2009.01)

(52) U.S. Cl.
   CPC .............. *H04L 5/14* (2013.01); *H04L 5/1423* (2013.01); *H04W 16/14* (2013.01); *H04W 16/24* (2013.01); *H04W 72/082* (2013.01); *H04W 72/0453* (2013.01)

(56) References Cited

U.S. PATENT DOCUMENTS

| | | | |
|---|---|---|---|
| 2010/0195586 A1* | 8/2010 | Choi | H04W 72/042 370/329 |
| 2010/0240387 A1* | 9/2010 | Ezaki | H04W 52/243 455/452.2 |
| 2011/0136534 A1* | 6/2011 | Nanba | H04J 3/00 455/522 |
| 2013/0114562 A1* | 5/2013 | Seo | H04W 52/146 370/329 |
| 2014/0134984 A1* | 5/2014 | Mufti | H04W 4/70 455/414.1 |
| 2014/0169234 A1 | 6/2014 | Zhu et al. | |
| 2015/0055515 A1 | 2/2015 | Cheng et al. | |
| 2015/0085805 A1 | 3/2015 | Li et al. | |
| 2015/0280887 A1 | 10/2015 | Ko et al. | |
| 2015/0327293 A1 | 11/2015 | Luo et al. | |
| 2016/0373971 A1* | 12/2016 | Kulal | H04W 24/02 |
| 2017/0127411 A1* | 5/2017 | Miao | H04L 27/2607 |
| 2017/0134913 A1* | 5/2017 | Cui | H04B 7/06 |
| 2017/0171887 A1* | 6/2017 | Shi | H04W 16/14 |
| 2018/0160442 A1 | 6/2018 | Wilkinson et al. | |
| 2018/0316405 A1* | 11/2018 | Li | H04B 7/043 |

FOREIGN PATENT DOCUMENTS

| | | |
|---|---|---|
| CN | 103220812 A | 7/2013 |
| CN | 103458420 A | 12/2013 |
| CN | 103945554 A | 7/2014 |
| CN | 104105208 A | 10/2014 |
| CN | 104838610 A | 8/2015 |
| EP | 2858398 A1 | 4/2015 |
| EP | 2919411 A1 | 9/2015 |
| JP | 2013544056 A | 12/2013 |
| JP | 2016503977 A | 2/2016 |
| WO | 2014090199 A1 | 6/2014 |

\* cited by examiner

CONFIGURATION METHOD AND APPARATUS

CROSS-REFERENCE TO RELATED APPLICATIONS

This application is a continuation of International Application No. PCT/CN2016/100200, filed on Sep. 26, 2016, which claims priority to Chinese Patent Application No. 201510925926.6, filed on Dec. 11, 2015. The disclosures of the aforementioned applications are hereby incorporated by reference in their entireties.

TECHNICAL FIELD

Embodiments of the present disclosure relate to the field of communications technologies, and in particular, to a configuration method and apparatus.

BACKGROUND

A full-duplex wireless communications technology is a new communications technology. By using the technology, co-time and co-frequency communications may be implemented.

However, in a case of continuous networking, or when a local cell has a plurality of user equipments, if the plurality of user equipments communicate with each other in a co-time and co-frequency manner, and user equipment that performs uplink transmission is relatively close to user equipment that performs downlink receiving, the user equipment that performs downlink receiving in a co-frequency manner is greatly interfered when the user equipment for uplink transmission performs uplink transmission.

SUMMARY

Embodiments of the present disclosure provide a configuration method and apparatus, so as to reduce interference between user equipments in a full-duplex system.

To achieve the foregoing objective, the following technical solutions are used in the embodiments of the present disclosure.

According to a first aspect, the embodiments of the present disclosure provide a configuration method, applied to a full-duplex system, where the method includes:

dividing, by a base station, user equipments in a first cell into N user groups, where N is a positive integer greater than or equal to 2, interference exists between user equipments in each of the N user groups, and existence of the interference indicates that when a user equipment performs uplink transmission, downlink receiving performed by another user equipment in a co-time and co-frequency manner is interfered; and configuring, by the base station for a user equipment in each of the N user groups, an uplink frequency band used for uplink transmission and a downlink frequency band used for downlink receiving, wherein in a same user group, the uplink frequency band is different from the downlink frequency band, and the uplink frequency band and the downlink frequency band are frequency sub-bands of an operating frequency band of the full-duplex system.

With reference to the first aspect, in a first possible implementation of the first aspect, the N user groups include a first user group and a second user group, and interference exists between a user equipment in the first user group and a user equipment in the second user group; and that the base station configures, for user equipments in the first user group and the second user group, an uplink frequency band used for uplink transmission and a downlink frequency band used for downlink receiving includes:

configuring the uplink frequency band of the first user group and the downlink frequency band of the second user group as different frequency bands, and configuring the downlink frequency band of the first user group and the uplink frequency band of the second user group as different frequency bands.

With reference to the first aspect or the first possible implementation of the first aspect, in a second possible implementation of the first aspect, the N user groups include a third user group and a fourth user group, and no interference exists between a user equipment in the third user group and a user equipment in the fourth user group; and that the base station configures, for user equipments in the third user group and the fourth user group, an uplink frequency band used for uplink transmission and a downlink frequency band used for downlink receiving includes:

configuring the uplink frequency band of the third user group and the downlink frequency band of the fourth user group as a same frequency band, and configuring the downlink frequency band of the third user group and the uplink frequency band of the fourth user group as a same frequency band.

With reference to the first aspect, the first possible implementation of the first aspect, or the second possible implementation of the first aspect, in a third possible implementation of the first aspect, the dividing, by a base station, user equipments in a first cell into N user groups includes:

obtaining, by the base station, geographical location information of the user equipments in the first cell; and dividing, by the base station, the user equipments in the first cell into the N user groups according to the geographical location information of the user equipments.

With reference to the third possible implementation of the first aspect, in a fourth possible implementation of the first aspect, when the first user group is adjacent to the second user group, the base station determines that interference exists between the user equipment in the first user group and the user equipment in the second user group; or when the third user group is not adjacent to the fourth user group, the base station determines that no interference exists between the third user group and the fourth user group.

With reference to the second possible implementation of the first aspect, in a fifth possible implementation of the first aspect, the dividing, by a base station, user equipments in a first cell into N user groups includes:

dividing, by the base station, the user equipments into the N user groups according to interference information between the user equipments in the first cell, where interference exists between any one of user equipments in a user group and at least one user equipment in the same user group.

With reference to the fifth possible implementation of the first aspect, in a sixth possible implementation of the first aspect, when interference exists between at least one user equipment in the first user group and at least one user equipment in the second user group, the base station determines that interference exists between the user equipment in the first user group and the user equipment in the second user group; and when no interference exists between any user equipment in the third user group and any user equipment in the fourth user group, the base station determines that no interference exists between the user equipment in the third user group and the user equipment in the fourth user group.

With reference to any one of the first aspect to the sixth possible implementation of the first aspect, in a seventh possible implementation of the first aspect, the method further includes:

obtaining, by the base station, configuration information of a second cell, where the configuration information of the second cell includes at least an uplink frequency band and a downlink frequency band of a user group that is in the second cell and that interferes with the first cell, and the second cell is a cell adjacent to the first cell;

if a fifth user group is a user group that is in the second cell and that interferes with the first cell, and an uplink frequency band of the fifth user group is the same as a downlink frequency band of a sixth user group in user groups that are in the first cell and that interfere with the second cell, adjusting the downlink frequency band of the sixth user group, so that the downlink frequency band of the sixth user group is different from the uplink frequency band of the fifth user group; or if a seventh user group is a user group that is in the second cell and that interferes with the first cell, and a downlink frequency band of the seventh user group is the same as an uplink frequency band of an eighth user group in user groups that are in the first cell and that interfere with the second cell, adjusting the uplink frequency band of the eighth user group, so that the uplink frequency band of the eighth user group is different from the downlink frequency band of the seventh user group.

With reference to any one of the first aspect to the sixth possible implementation of the first aspect, in an eighth possible implementation of the first aspect, the method further includes:

obtaining, by the base station, configuration information of a third cell, where the configuration information of the third cell includes at least an uplink frequency band, a downlink frequency band, and time scheduling information of a user group that is in the third cell and that interferes with the first cell, and the third cell is a cell adjacent to the first cell;

if a ninth user group is a user group that is in the third cell and that interferes with the first cell, and an uplink frequency band of the ninth user group is the same as a downlink frequency band of a tenth user group in the first cell, adjusting a scheduling time of the tenth user group to a scheduling time different from a scheduling time of the ninth user group, where the ninth user group belongs to the third cell, and the tenth user group belongs to the first cell; or if an eleventh user group is a user group that is in the third cell and that interferes with the first cell, and a downlink frequency band of the eleventh user group is the same as an uplink frequency band of a twelfth user group in the first cell, adjusting a scheduling time of the twelfth user group to a scheduling time different from a scheduling time of the eleventh user group, where the twelfth user group belongs to the first cell, and the eleventh user group belongs to the third cell.

According to a second aspect, the embodiments of the present disclosure provide a configuration apparatus, applied to a full-duplex system, where the apparatus includes:

a grouping unit, configured to divide user equipments in a first cell into N user groups, where N is a positive integer greater than or equal to 2, interference exists between user equipments in each of the N user groups, and existence of the interference indicates that when a user equipment performs uplink transmission, downlink receiving performed by another user equipment in a co-time and co-frequency manner is interfered; and a configuration unit, configured to configure, for a user equipment in each of the N user groups, an uplink frequency band used for uplink transmission and a downlink frequency band used for downlink receiving, wherein in a same user group, the uplink frequency band is different from the downlink frequency band, and the uplink frequency band and the downlink frequency band are frequency sub-bands of an operating frequency band of the full-duplex system.

With reference to the second aspect, in a first possible implementation of the second aspect, the N user groups include a first user group and a second user group, and interference exists between a user equipment in the first user group and a user equipment in the second user group; and the configuration unit is specifically configured to:

configure an uplink frequency band of the first user group and a downlink frequency band of the second user group as different frequency bands, and configure a downlink frequency band of the first user group and an uplink frequency band of the second user group as different frequency bands.

With reference to the second aspect or the first possible implementation of the second aspect, in a second possible implementation of the second aspect, the N user groups include a third user group and a fourth user group, and no interference exists between a user equipment in the third user group and a user equipment in the fourth user group; and the configuration unit is further configured to:

configure an uplink frequency band of the third user group and a downlink frequency band of the fourth user group as a same frequency band, and configure a downlink frequency band of the third user group and an uplink frequency band of the fourth user group as a same frequency band.

With reference to any one of the second aspect to the second possible implementation of the second aspect, in a third possible implementation of the second aspect, the grouping unit includes:

a first obtaining module, configured to obtain geographical location information of the user equipments in the first cell; and a first division module, configured to divide the user equipments in the first cell into the N user groups according to the geographical location information of the user equipments.

With reference to the third possible implementation of the second aspect, in a fourth possible implementation of the second aspect, the apparatus further includes:

a first judging unit, configured to determine whether the first user group is adjacent to the second user group;

a first determining unit, configured to: when the first judging unit determines that the first user group is adjacent to the second user group, determine that interference exists between the user equipment in the first user group and the user equipment in the second user group; and a second determining unit, configured to: when the first judging unit determines that the third user group is not adjacent to the fourth user group, determine, by the base station, that no interference exists between the third user group and the fourth user group.

With reference to the second possible implementation of the second aspect, in a fifth possible implementation of the second aspect, the grouping unit includes:

a second division module, configured to divide the user equipments into the N user groups according to interference information between the user equipments in the first cell, where interference exists between any one of user equipments in a user group and at least one user equipment in the same user group.

With reference to the fifth possible implementation of the second aspect, in a sixth possible implementation of the second aspect, the apparatus further includes:

a second judging unit, configured to determine whether the first user group includes at least one user equipment that interferes with at least one user equipment in the second user group;

a third determining unit, configured to: when the second judging unit determines that interference exists between the at least one user equipment in the first user group and the at least one user equipment in the second user group, determine, by the base station, that interference exists between the user equipment in the first user group and the user equipment in the second user group;

a third judging unit, configured to determine whether no interference exists between any user equipment in the third user group and any user equipment in the fourth user group; and a fourth determining unit, configured to: when the third judging unit determines that no interference exists between any user equipment in the third user group and any user equipment in the fourth user group, determine that no interference exists between the user equipment in the third user group and the user equipment in the fourth user group.

With reference to any one of the second aspect to the sixth possible implementation of the second aspect, in a seventh possible implementation of the second aspect, the apparatus further includes:

a first obtaining unit, configured to: obtain configuration information of a second cell, where the configuration information of the second cell includes at least an uplink frequency band and a downlink frequency band of a user group that is in the second cell and that interferes with the first cell, and the second cell is a cell adjacent to the first cell;

a first adjusting unit, configured to:

if a fifth user group is a user group that is in the second cell and that interferes with the first cell, and an uplink frequency band of the fifth user group is the same as a downlink frequency band of a sixth user group in user groups that are in the first cell and that interfere with the second cell, adjust the downlink frequency band of the sixth user group, so that the downlink frequency band of the sixth user group is different from the uplink frequency band of the fifth user group; or if a seventh user group is a user group that is in the second cell and that interferes with the first cell, and a downlink frequency band of the seventh user group is the same as an uplink frequency band of an eighth user group in user groups that are in the first cell and that interfere with the second cell, adjust the uplink frequency band of the eighth user group, so that the uplink frequency band of the eighth user group is different from the downlink frequency band of the seventh user group.

With reference to any one of the second aspect to the sixth possible implementation of the second aspect, in an eighth possible implementation of the second aspect, the apparatus further includes:

a second obtaining unit, configured to obtain configuration information of a third cell, where the configuration information of the third cell includes at least an uplink frequency band, a downlink frequency band, and time scheduling information of a user group that is in the third cell and that interferes with the first cell, and the third cell is a cell adjacent to the first cell; and a second adjusting unit, configured to:

if a ninth user group is a user group that is in the third cell and that interferes with the first cell, and an uplink frequency band of the ninth user group is the same as a downlink frequency band of a tenth user group in the first cell, adjust a scheduling time of the tenth user group to a scheduling time different from a scheduling time of the ninth user group, where the ninth user group belongs to the third cell, and the tenth user group belongs to the first cell; or if an eleventh user group is a user group that is in the third cell and that interferes with the first cell, and a downlink frequency band of the eleventh user group is the same as an uplink frequency band of a twelfth user group in the first cell, adjust a scheduling time of the twelfth user group to a scheduling time different from a scheduling time of the eleventh user group, where the twelfth user group belongs to the first cell, and the eleventh user group belongs to the third cell.

With reference to any one of the second aspect to the sixth possible implementation of the second aspect, in a ninth possible implementation of the second aspect, the apparatus further includes:

a sending unit, configured to: send, by the base station, configuration information of the first cell to a base station of a fourth cell, where the configuration information of the first cell includes at least an uplink frequency band, a downlink frequency band, and time scheduling information of a user group that is in the first cell and that interferes with the fourth cell.

According to the configuration method provided in the embodiments of the present disclosure, the base station divides the user equipments in the first cell into the N user groups, where N is a positive integer greater than or equal to 2, interference exists between the user equipments in each of the N user groups, and existence of the interference indicates that when user equipment performs uplink transmission, downlink receiving performed by another user equipment in a co-time and co-frequency manner is interfered; and configures, for the user equipment in each of the N user groups, the uplink frequency band used for uplink transmission and the downlink frequency band used for downlink receiving, where the uplink frequency band is different from the downlink frequency band in a same user group, and the uplink frequency band and the downlink frequency band are the frequency sub-bands of the operating frequency band of the full-duplex system. Because interference exists between the user equipments in each user group, when an uplink frequency band and a downlink frequency band in different frequency bands are configured for user equipments in a same user group, interference caused by uplink transmission of user equipment in the user group to downlink receiving of another user equipment in the user group can be avoided. In addition, the uplink frequency band and the downlink frequency band are the frequency sub-bands of the operating frequency band of the full-duplex system, so that the base station can provide an uplink transmission service and a downlink receiving service for different user equipments in the first cell in the full-duplex system on different frequency sub-bands of a same operating frequency band.

BRIEF DESCRIPTION OF DRAWINGS

To describe the technical solutions in the embodiments of the present disclosure more clearly, the following briefly describes the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure.

An operating principle of the embodiments of the present disclosure is:

a full-duplex wireless communications technology.

Figure 1A:
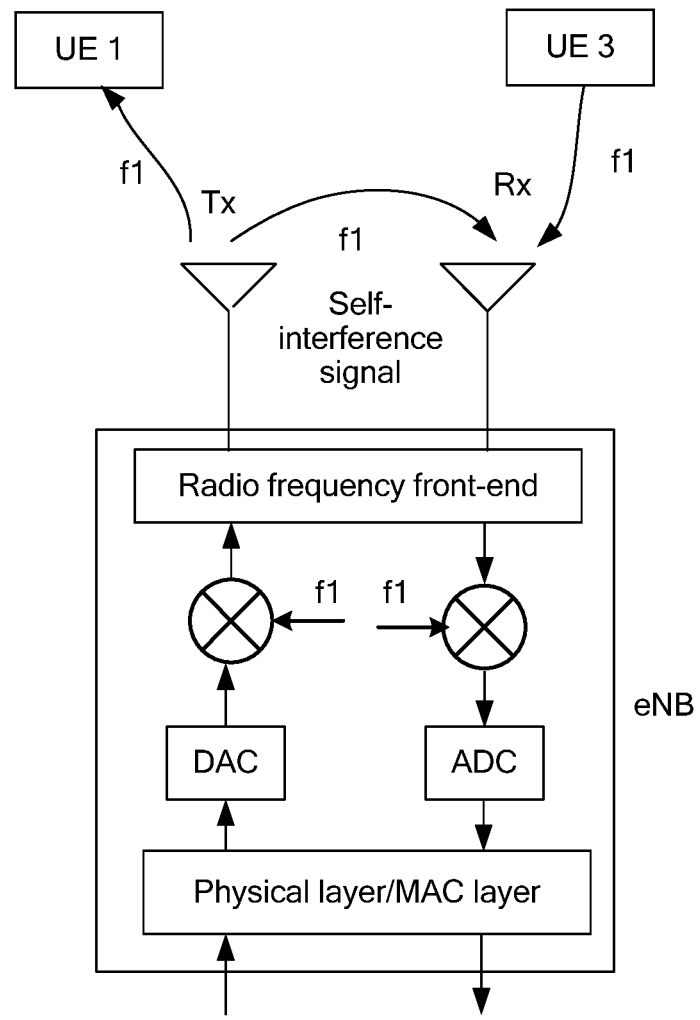
FIG. 1A is a schematic diagram of a communications network in a full-duplex system according to an embodiment of the present disclosure.

By using the technology, co-time and co-frequency communications may be implemented. As shown in FIG. 1A, when two communications devices, for example, base stations eNB (evolved NodeB) 1 and eNB 2 communicate with each other in a co-time and co-frequency manner, a receive antenna not only receives a wanted signal of a peer end but also receives a signal sent by the receive antenna, that is, a self-interference signal. In addition, because a transmit antenna is relatively close to the receive antenna, strength of the self-interference signal is generally far higher than that of the wanted signal from the peer end.

To improve spectral efficiency, an eNB (evolved NodeB) may use a full-duplex mode for communication. When performing sending to a UE (user equipment) 1 on a carrier f1, the eNB receives, on the same carrier f1, an uplink signal sent by UE 3 (the UE herein may further communicate with a full-duplex eNB by retaining a half-duplex model). In a case of continuous networking, or when a local cell has a plurality of user equipments, when a UE for uplink transmission is relatively close to a UE for downlink receiving, UE 1 that performs uplink transmission causes relatively great interference to UE 3 that performs downlink receiving, as the UE 1 and the UE 3 shown in FIG. 1A.

A conventional eNB performs sending according to FDD (frequency division duplex) or TDD (time division duplex). The eNB does not perform sending by simultaneously using an uplink frequency band and a downlink frequency band. Therefore, small interference exists between UEs. Mainly, downlink transmission of a UE in a cell of the eNB interferes with uplink receiving of a UE in another cell, or downlink transmission of a UE in a cell interferes with uplink receiving of a UE of another eNB.

Figure 1B:
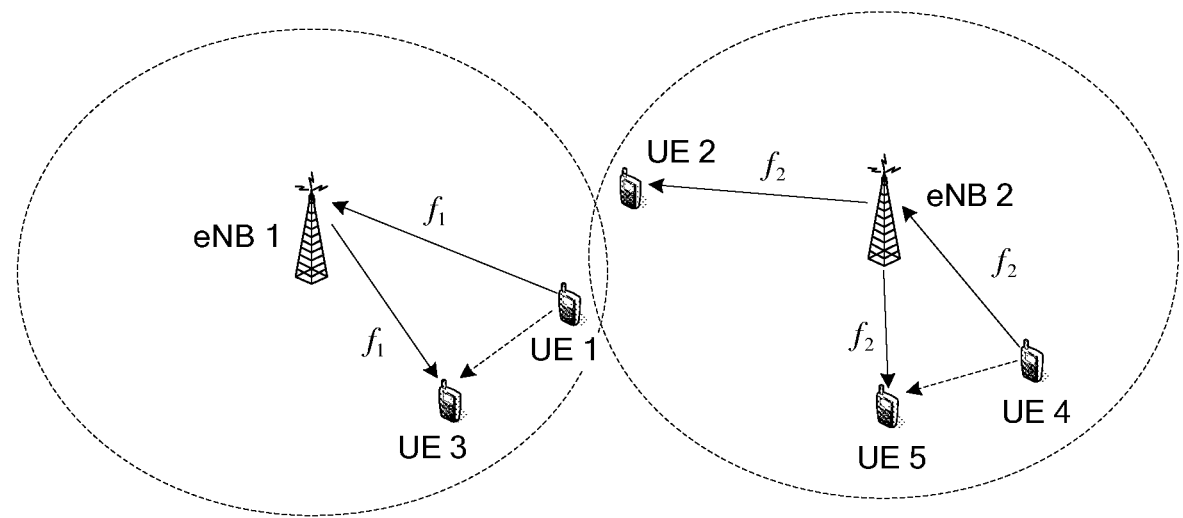
FIG. 1B is a schematic diagram of a communications network in which interference exists between user equipments and between cells adjacent to each other in a full-duplex system according to an embodiment of the present disclosure.

However, as shown in FIG. 1B, in an entire-network duplex mode, for user equipments in a same cell, if the user equipments are relatively close to each other, when user equipment performs uplink transmission on an uplink frequency band f1, downlink receiving performed by another user equipment on a downlink frequency band f1 is greatly interfered. For example, for UE 1 and UE 3 covered by an eNB 1, because the UE 1 is relatively close to the UE 3, when the UE 1 performs uplink transmission on the uplink frequency band f1, and the UE 3 simultaneously performs downlink receiving on the downlink frequency band f1, the UE 1 greatly interferes with downlink receiving of the UE 3. A same case also occurs on UE 4 and UE 5 of an eNB 2.

According to the configuration method provided in the embodiments of the present disclosure, a base station divides user equipments in a first cell into N user groups, where N is a positive integer greater than or equal to 2, interference exists between user equipments in each of the N user groups, and existence of the interference indicates that when user equipment performs uplink transmission, downlink receiving performed by another user equipment in a co-time and co-frequency manner is interfered; and configures, for user equipment in each of the N user groups, an uplink frequency band used for uplink transmission and a downlink frequency band used for downlink receiving, where the uplink frequency band is different from the downlink frequency band in a same user group, and the uplink frequency band and the downlink frequency band are frequency sub-bands of an operating frequency band of a full-duplex system. Because interference exists between the user equipments in each user group, when an uplink frequency band and a downlink frequency band in different frequency bands are configured for user equipments in a same user group, interference caused by uplink transmission of user equipment in the user group to downlink receiving of another user equipment in the user group can be avoided. In addition, the uplink frequency band and the downlink frequency band are the frequency sub-bands of the operating frequency band of the full-duplex system, so that the base station can provide an uplink transmission service and a downlink receiving service for different user equipments in the first cell in the full-duplex system on different frequency sub-bands of a same operating frequency band.

To facilitate clear description of the technical solutions in the embodiments of the present disclosure, words such as "first" and "second" are used in the embodiments of the present disclosure to distinguish between the same items or similar items that provide basically the same functions or purposes. A person skilled in the art may understand that the words such as "first" and "second" do not restrict the number and the implementation order.

The technical solutions provided in the embodiments of the present disclosure may be applied to various wireless communications networks such as a Global System for Mobile Communications (GSM), a Code Division Multiple Access (CDMA) system, a Wideband Code Division Multiple Access (WCDMA) system, a Universal Mobile Telecommunications System (UMTS), a general packet radio service (GPRS) system, a Long Term Evolution (LTE) system, a Long Term Evolution Advanced (LTE-A) system, and a Worldwide Interoperability for Microwave Access (WiMAX) system. The terms "network" and "system" can be interchanged with each other.

In the embodiments of the present disclosure, a base station (BS for short) may be a device that communicates with a UE (user equipment) or another communications station such as a relay station, and the base station may provide communication coverage in a specific physical area. For example, the base station may be specifically a base transceiver station (BTS) or a base station controller (BSC) in a GSM or CDMA; or may be a node B (NB) in UMTS or a radio network controller (RNC) in UMTS; or may be an evolved NodeB (eNB or eNodeB) in LTE; or may be another access network device that provides an access service in a wireless communications network. This is not limited in the embodiments of the present disclosure.

In the embodiments of the present disclosure, the UE may be distributed in an entire wireless network, and each UE may be stationary or in motion.

The UE may be referred to as a terminal, a mobile station, a subscriber unit, a station, or the like. The UE may be a cellular phone, a personal digital assistant (PDA), a wireless modem, a wireless communications device, a handheld device, a laptop computer, a cordless phone, a wireless local loop (WLL) station, or the like. When the UE is applied to communication in an M2M manner, the UE may be referred to as an M2M terminal and may be specifically a smart meter, a smart appliance, or the like that supports M2M communication.

Figure 2A:
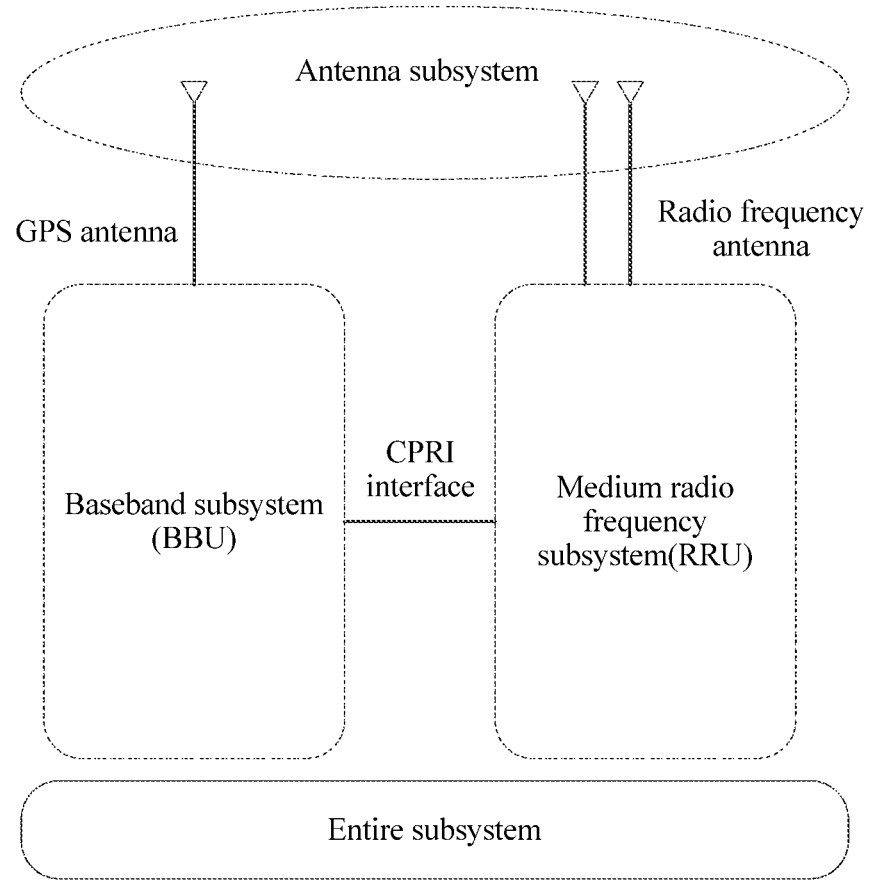
FIG. 2A is a schematic structural diagram of a base station in a configuration method according to an embodiment of the present disclosure.

The configuration method and the configuration apparatus provided in the embodiments of the present disclosure may be performed by a base station eNB. As shown in FIG. 2A, the base station eNodeB includes a baseband subsystem, a medium radio frequency subsystem, an antenna subsystem, and some support structures (for example, an entire subsystem). The baseband subsystem is used to implement operation and maintenance of the entire base station, signaling processing, radio resource management, and a transmission interface to an EPC (evolved packet core), and implement a main control function of operation and maintenance of an LTE physical layer, a MAC (Media Access Control) layer, and L3 signaling. The medium radio frequency subsystem implements conversion among a baseband signal, an intermediate frequency signal, and a radio frequency signal, and implements demodulation of an LTE wireless receive signal, modulation of a transmit signal, and power amplification. The antenna subsystem includes an antenna and a feeder connected to a radio frequency module of the base station, and an antenna and a feeder of a GRS receiving card, so as to implement receiving and sending of a wireless air interface signal. The entire subsystem is a support part of the baseband subsystem and the medium radio frequency subsystem, and provides a structure, power supply, and environment monitoring function.

Figure 2B:
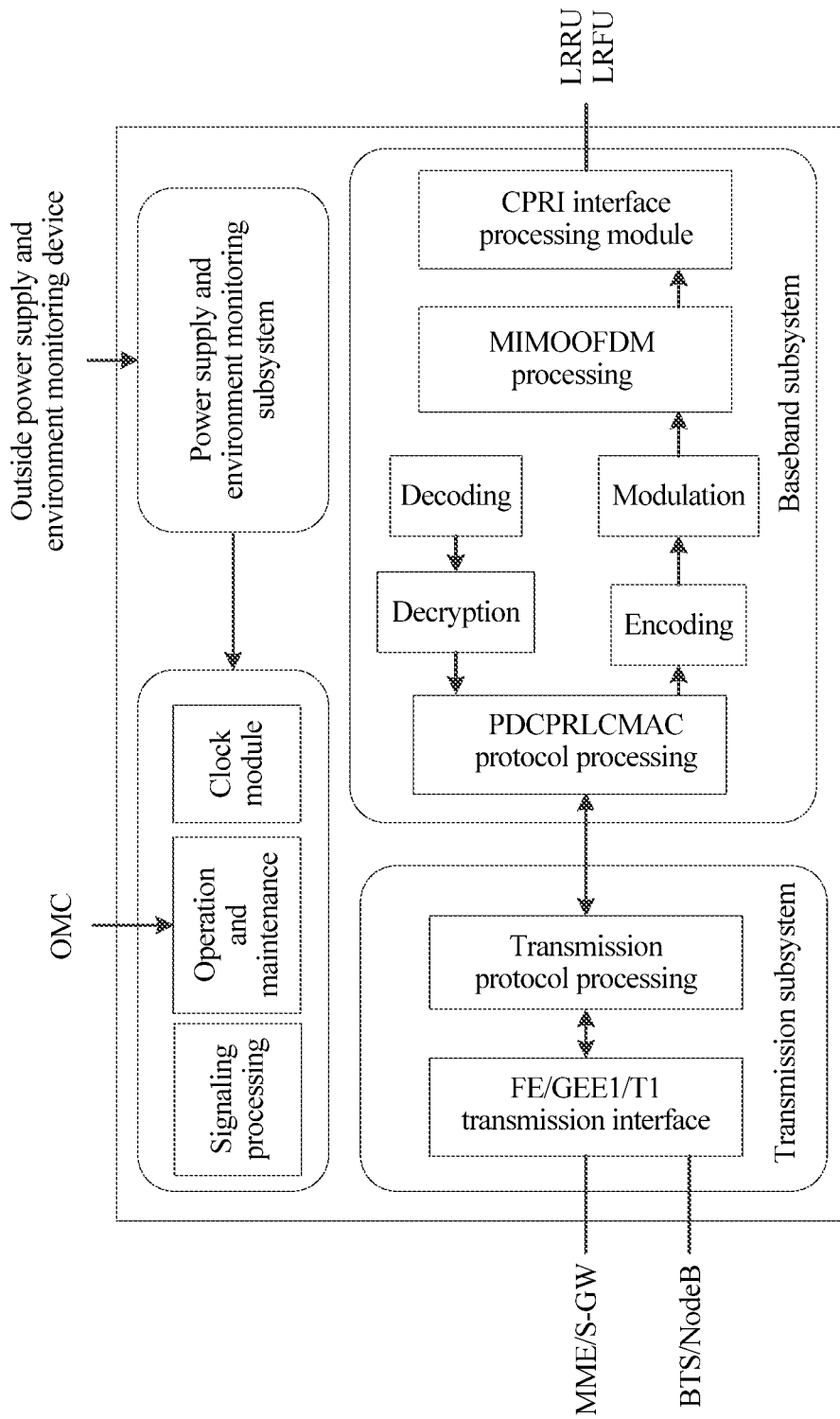
FIG. 2B is a schematic structural diagram of a baseband subsystem of a base station in a configuration method according to an embodiment of the present disclosure.

The baseband subsystem may be shown in FIG. 2B. For example, that a mobile phone accesses the Internet may be as follows: The mobile phone accesses a core network (MME/S-GW) by using the base station, and then accesses the Internet by using the core network. Herein, data of the Internet is transmitted to a baseband part by using an interface between the core network and the base station; the baseband part performs processing such as encoding and modulation at a PDCP layer, an RLC layer, and a MAC layer, and sends processed data to a radio frequency part; and the radio frequency part transmits the processed data to the terminal. The baseband part may be connected to the radio frequency part by using a CPRI interface. In addition, an optical fiber is currently used to extend the radio frequency part, for example, a remote RRU. A baseband in each step of the configuration method in the embodiments of the present disclosure is implemented by using a radio frequency. In addition, a receiving step and a sending step are implemented by using an antenna (for example, an air interface).

An interface between user equipment and a base station related in the embodiments of the present disclosure may be understood as an air interface for communication between the user equipment and the base station, or the interface may be referred to as a Uu interface.

Figure 3:
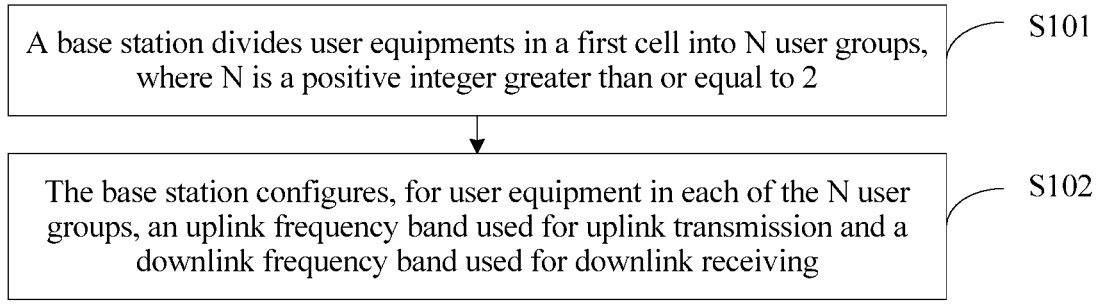
FIG. 3 is a schematic flowchart 1 of a configuration method according to an embodiment of the present disclosure.

As shown in FIG. 3, an embodiment of the present disclosure provides a configuration method. The method is applied to a full-duplex system, and includes the following steps:

S101. A base station divides user equipments in a first cell into N user groups, where N is a positive integer greater than or equal to 2, interference exists between user equipments in each of the N user groups, and existence of the interference indicates that when a user equipment performs uplink transmission, downlink receiving performed by another user equipment in a co-time and co-frequency manner is interfered.

S102. The base station configures, for a user equipment in each of the N user groups, an uplink frequency band used for uplink transmission and a downlink frequency band used for downlink receiving, where the uplink frequency band is different from the downlink frequency band in a same user group, and the uplink frequency band and the downlink frequency band are frequency sub-bands of an operating frequency band of the full-duplex system.

According to the configuration method provided in this embodiment of the present disclosure, the base station divides the user equipments in the first cell into the N user groups, where N is a positive integer greater than or equal to 2, interference exists between the user equipments in each of the N user groups, and existence of the interference indicates that when user equipment performs uplink transmission, downlink receiving performed by another user equipment in a co-time and co-frequency manner is interfered; and configures, for the user equipment in each of the N user groups, the uplink frequency band used for uplink transmission and the downlink frequency band used for downlink receiving, where the uplink frequency band is different from the downlink frequency band in a same user group, and the uplink frequency band and the downlink frequency band are the frequency sub-bands of the operating frequency band of the full-duplex system. Because interference exists between the user equipments in each user group, when an uplink frequency band and a downlink frequency band in different frequency bands are configured for user equipments in a same user group, interference caused by uplink transmission of user equipment in the user group to downlink receiving of another user equipment in the user group can be avoided. In addition, the uplink frequency band and the downlink frequency band are the frequency sub-bands of the operating frequency band of the full-duplex system, so that the base station can provide an uplink transmission service and a downlink receiving service for different user equipments in the first cell in the full-duplex system on different frequency sub-bands of a same operating frequency band.

Figure 4:
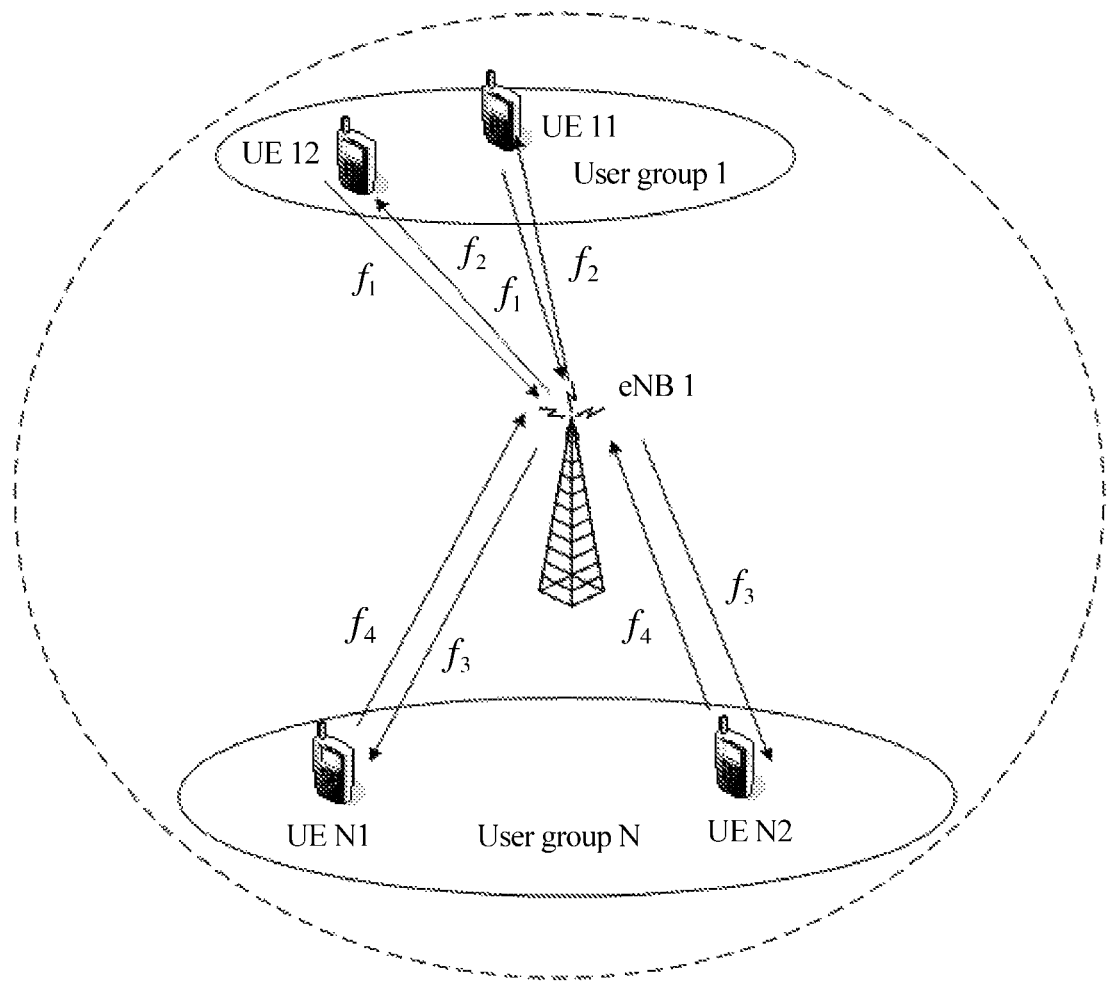
FIG. 4 is a schematic diagram of a communications network of configuring an uplink frequency band and a downlink frequency band in different frequency bands for a same user group in a first cell in a configuration method according to an embodiment of the present disclosure.

For example, as shown in FIG. 4, FIG. 4 is a scenario of reducing interference between user equipments in a first cell in actual application by using a configuration method in an embodiment of the present disclosure (in FIG. 4, two user groups, that is, a user group 1 and a user group N are used merely as an example). The base station configures an uplink frequency band f1 and a downlink frequency band f2 for user equipments UE 11 and UE 12 in the user group 1 in the first cell. The base station configures an uplink frequency band f3 and a downlink frequency band f4 for user equipments UE N1 and UE N2 in the user group N.

Because the UE 11 uses the downlink frequency band f2 to perform downlink receiving, and the UE 12 uses the uplink frequency band f1 to perform uplink transmission, when the UE 12 performs uplink transmission on the uplink frequency band f1, downlink receiving performed by the UE 11 on the downlink frequency band f2 is not interfered. Likewise, it may be learned that when the UE 11 performs uplink transmission on the uplink frequency band f1, downlink receiving performed by the UE 12 on the downlink frequency band is not interfered. Therefore, interference that is caused by signal transmission performed on the uplink frequency band by user equipment in any user group in the first cell to downlink receiving performed on the downlink frequency band by remaining user equipments in the same user group may be reduced.

It should be noted that, in the present disclosure, $f1+f2+f3+\ldots+fN=f$, and f is the operating frequency band of the full-duplex system. For example, if f is 10 MHz, f is divided into five frequency sub-bands that are separately corresponding to f1 to f5. The operating frequency band of the full-duplex system may be equally divided, and then be configured for each user group. Bandwidth of an uplink frequency band of each user group is the same as that of a downlink frequency band of the user group. That is, the bandwidth of each user group is 2.0 MHz. Herein, f1 is from 0 MHz to 2.0 MHz (including 0 MHz and 2.0 MHz), f2 is from 2.0 MHz to 4.0 MHz (including 2.0 MHz and 4.0 MHz), f3 is from 4.0 MHz to 6.0 MHz (including 4.0 MHz and 6.0 MHz), f4 is from 6.0 MHz to 8.0 MHz (including 6.0 MHz and 8.0 MHz), and f5 is from 8.0 MHz to 10.0 MHz (including 8.0 MHz and 10.0 MHz). An uplink frequency band and a downlink frequency band with different bandwidth may be further allocated to each user group according to an actual requirement.

For example, an uplink frequency band and a downlink frequency band of a user group that are loaded with more user equipments may be set to be relatively large, and an uplink frequency band and a downlink frequency band of a user group that are loaded with fewer user equipments may be set to be relatively small. This is not limited in this embodiment of the present disclosure.

Further, when N is greater than or equal to 2, a first case may exist: Interference exists between any two user groups in the N user groups in the first cell; or a second case may exist: No interference exists between any two user groups in the N user groups in the first cell.

Preferably, 1. When any two user groups in the N user groups in the first cell are in the first case, because the base station applies a same configuration manner and principle to any two user groups in the N user groups, a first user group and a second user group are merely used as an example for description in this embodiment of the present disclosure. The first user group and the second user group are any two user groups in the N user groups.

To reduce interference between the user groups in the first cell, and further reduce interference between user equipments, for example, step S102 may be specifically implemented in the following manner.

S1021A. Configure an uplink frequency band of a first user group and a downlink frequency band of a second user group as different frequency bands, and configure a downlink frequency band of the first user group and an uplink frequency band of the second user group as different frequency bands.

The first user group and the second user group are any two user groups in the N user groups.

Figure 5:
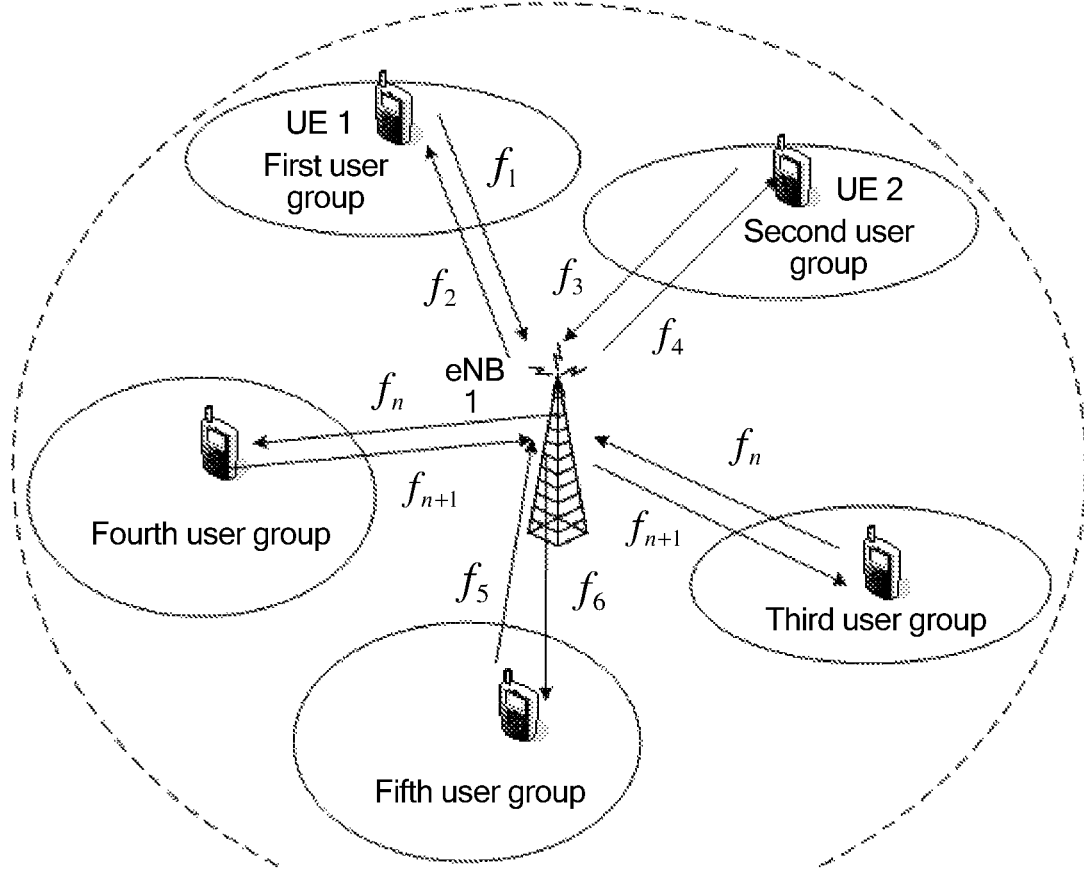
FIG. 5 is a schematic diagram of a communications network of configuring an uplink frequency band and a downlink frequency band in different frequency bands for user groups that interfere with each other in a first cell in a configuration method according to an embodiment of the present disclosure.

For example, as shown in FIG. 5, FIG. 5 is a scenario of reducing interference between user groups in a first cell in actual application by using a configuration method in an embodiment of the present disclosure. Description is provided by using an example in which interference exists between the first user group and the second user group.

A base station eNB 1 configures, for user equipment UE 1 in the first user group in the first cell, an uplink frequency band f1 used for uplink transmission and a downlink frequency band f2 used for downlink receiving. The base station eNB 1 configures, for the second user group, the uplink frequency band f3 and the downlink frequency band f4 used for downlink receiving. Because f1, f2, f3, and f4 are separately different frequency bands, when the user equipment UE 1 in the first user group sends an uplink signal to the eNB 1 on the uplink frequency band f1, downlink receiving performed by the user equipment UE 2 in the second user group on the downlink frequency band f4 is not interfered. Therefore, when interference exists between any two user groups in the first cell, interference that is caused by signal transmission performed on the uplink frequency band by user equipment in any user group in the first cell to receiving performed on the downlink frequency band by user equipment in another user group may be reduced.

Preferably, 2. When any two user groups in the N user groups in the first cell is in the second case, because the base station of the first cell applies a same configuration manner and principle to any two user groups in the N user groups, a third user group and a fourth user group are merely used as an example for description in this embodiment of the present disclosure. The third user group and the fourth user group are any two user groups in the N user groups.

To enable user equipment in each user group to use a relatively large frequency sub-band, when no interference exists between any two user groups, for example, step S102 may be specifically implemented in the following manner.

S1021B. Configure an uplink frequency band of a third user group and a downlink frequency band of a fourth user group as a same frequency band, and configure a downlink frequency band of the third user group and an uplink frequency band of the fourth user group as a same frequency band.

The third user group and the fourth user group are any two user groups in the N user groups.

As shown in FIG. 5, different from the first user group and the second user group, when no interference exists between the third user group and the fourth user group, the base station eNB 1 configures, for user equipment in the third user group in the first cell, an uplink frequency band $f_n$ used for uplink transmission and a downlink frequency band $f_{n+1}$ used for downlink receiving. The base station eNB 1 configures, for user equipment in the fourth user group, an uplink frequency band $f_{n+1}$ and a downlink frequency band $f_n$ used for downlink receiving. Because no interference exists between the third user group and the fourth user group, the uplink frequency band of the user equipment in the third user group is configured as the downlink frequency band of the fourth user group, and the downlink frequency band of the user equipment in the third user group is configured as the uplink frequency band of the user equipment in the fourth user group. In this way, resources of user equipment in each user group in the full-duplex system may increase.

Further, a specific manner in which the base station divides the user equipments in the first cell into the N user groups is not limited in this embodiment of the present disclosure.

Figure 6:
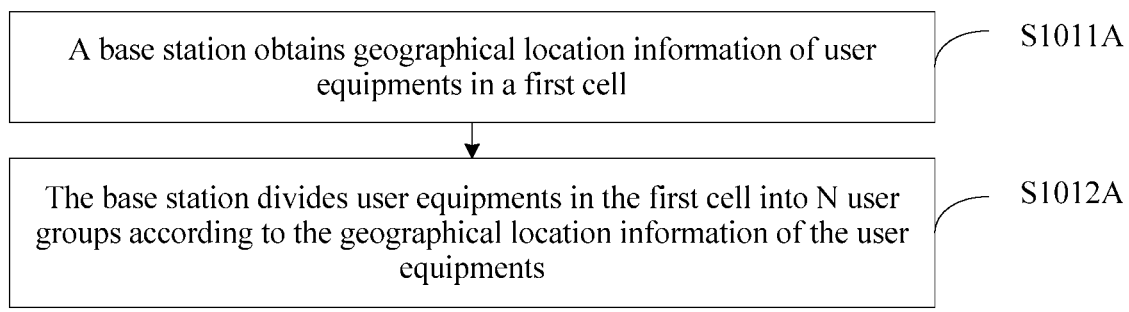
FIG. 6 is a schematic flowchart 2 of a configuration method according to an embodiment of the present disclosure.

For example, in an aspect, the base station may group the user equipments in the first cell by obtaining geographical location information of the user equipments in the first cell. As shown in FIG. 6, the following steps may be used for specific implementation.

S1011A. The base station obtains geographical location information of the user equipments in the first cell.

S1012A. The base station divides the user equipments in the first cell into the N user groups according to the geographical location information of the user equipments.

For the geographical location information of the user equipments in the first cell in this embodiment of the present disclosure, the base station may locate user equipment UE in the first cell by using a DOA (Direction of Arrival) method and a power measurement method, so as to obtain geographical location information of each user equipment in the first cell. Alternatively, the base station sends a positioning pilot signal to user equipment in the first cell. Then, the base station receives a user equipment location reported by the user equipment in the first cell according to the positioning pilot signal, so as to obtain the geographical location information of each user equipment in the first cell.

Figure 7:
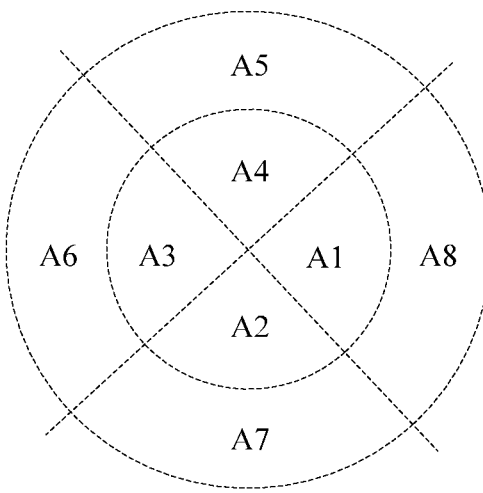
FIG. 7 is a schematic diagram of forming user groups according to geographical locations of user equipments in a configuration method according to an embodiment of the present disclosure.

In this embodiment of the present disclosure, the N user groups may be obtained by means of division in advance according to a coverage area of the base station, or area division is performed with reference to specific cell coverage. Then, a user group to which the user equipment belongs is determined according to the geographical location information of the user equipment. As shown in FIG. 7, the first cell may be divided into eight user groups of A1 to A8 according to an actual situation of the first cell, and user equipments whose geographical location information falls within a same user group are determined to be in the user group.

Further, when the base station groups the user equipments by using the geographical location information, that is, a manner shown in FIG. 7, the following manner may be used to determine whether interference exists between the first user group and the second user group in the first cell, and whether no interference exists between the third user group and the fourth user group.

A1. When the first user group is adjacent to the second user group, the base station determines that interference exists between the user equipment in the first user group and the user equipment in the second user group.

That two user groups are adjacent to each other indicates that there is at least one shared border between the two user groups, for example, the user group A1 and the user group A2, the user group A1 and the user group A3, the user group A1 and the user group A4, and the user group A1 and the user group A8 are user groups adjacent to each other.

A2. When the third user group is not adjacent to the fourth user group, the base station determines that no interference exists between the third user group and the fourth user group.

That two user groups are not adjacent to each other indicates that there is no shared border between the two user groups, for example, the user group A1 and the user group A6, the user group A6 and the user group A8, and the user group A1 and the user group A5 shown in FIG. 7.

Table 1 is a frequency band configuration table that is of the first cell and that is obtained according to the grouping shown in FIG. 7.

TABLE 1

| | Frequency band allocation | | | | | | | |
|---|---|---|---|---|---|---|---|---|
| | User group | | | | | | | |
| | A1 | A2 | A3 | A4 | A5 | A6 | A7 | A8 |
| Uplink frequency band | f1 | f2 | f3 | f4 | f5 | f6 | f7 | f8 |

TABLE 1-continued

Frequency band allocation

| | User group | | | | | | | |
|---|---|---|---|---|---|---|---|---|
| | A1 | A2 | A3 | A4 | A5 | A6 | A7 | A8 |
| Downlink frequency band | f6 | f5 | f8 | f7 | f2 | f1 | f4 | f3 |

As shown in Table 1, to ensure that no interference exists between user groups adjacent to each other after the first cell is grouped, the user groups adjacent to each other may be configured in the foregoing configuration manner. Details are not described in this embodiment of the present disclosure again. A configuration result is shown in Table 1, for example, the user group A1 and the user group A2, the user group A1 and the user group A4, and the user group A1 and the user group A8.

In this embodiment of the present disclosure, after grouping the first cell, the base station of the first cell may set the uplink frequency band of the third user group and the downlink frequency band of the fourth user group to a same frequency band, and set the downlink frequency band of the third user group and the uplink frequency band of the fourth user group to a same frequency band, for example, the user group A1 and the user group A6 shown in Table 1, where the third user group and the fourth user group are two user groups that do not interfere with each other.

With reference to FIG. 7 and Table 1, it may be learned that same configuration and a same principle is applied to uplink and downlink frequency bands of any two user groups adjacent to each other in the first cell. The user group A1 and the user group A2 are merely used as an example for description in this embodiment of the present disclosure, and this does not have any indicative meaning.

For example, an uplink frequency band and a downlink frequency band of user equipment in the user group A1 may be respectively set to f1 and f6, and an uplink frequency band and a downlink frequency band of user equipment in the user group A2 may be respectively set to f2 and f5. Because f1 and f5 are different frequency bands, the uplink frequency band of the user equipment in the user group A1 does not interfere with the downlink frequency band of the user equipment in the user group A2, so as to reduce interference between the user group A1 and the user group A2. Likewise, it may be learned that the uplink frequency band of the user group A2 does not interfere with the downlink frequency band of the user group A1.

Because a same configuration manner and principle are applied to uplink and downlink frequency bands of any two user groups that do not interfere with each other in the first cell, the user group A1 and the user group A6 not adjacent to the user group A1 are merely used as an example for description in this embodiment of the present disclosure, and this does not have any indicative meaning. For example, the uplink frequency band f1 of the user equipment in the user group A1 may be configured as a downlink frequency band of user equipment in the user group A6, and the downlink frequency band f6 of the user equipment in the user group A1 may be configured as an uplink frequency band of the user equipment in the user group A6. That is, configured frequency bands of the user group A6 are: an uplink frequency band f6 and a downlink frequency band f1. As shown in Table 1, because the user group A1 and the user group A6 are user groups not adjacent to each other, and the user group A1 is relatively far away from the user group A6, no interference exists between the user group A1 and the user group A6. In this way, bandwidth of an operating frequency band of each user group in the first cell may increase.

In another aspect, the user equipments in the first cell may be grouped according to the interference between the user equipments in the first cell, and the following manner may be used for specific implementation.

S1011B. The base station divides the user equipments into the N user groups according to interference information between the user equipments in the first cell, where interference exists between any one of user equipments in a user group and at least one user equipment in the same user group.

The interference information is an interference power between user equipments.

A manner of determining the interference information between the user equipments is not limited in this embodiment of the present disclosure. The interference information may be determined by using first user equipment in the first cell. The first user equipment is any user equipment in the first cell. The base station controls all the user equipments in the first cell to successively transmit a pilot symbol (a sequence is determined by the base station). The first user equipment in the first cell estimates an interference power caused by another user equipment for the first user equipment, and reports the measured interference power to the base station. The base station groups, into different user groups according to interference powers caused by all the user equipments for the first user equipment, user equipments whose interference values for the first user equipment are less than a preset interference threshold.

A specific value of the preset interference threshold is not limited in this embodiment of the present disclosure, and may be set according to an actual requirement.

Figure 8:
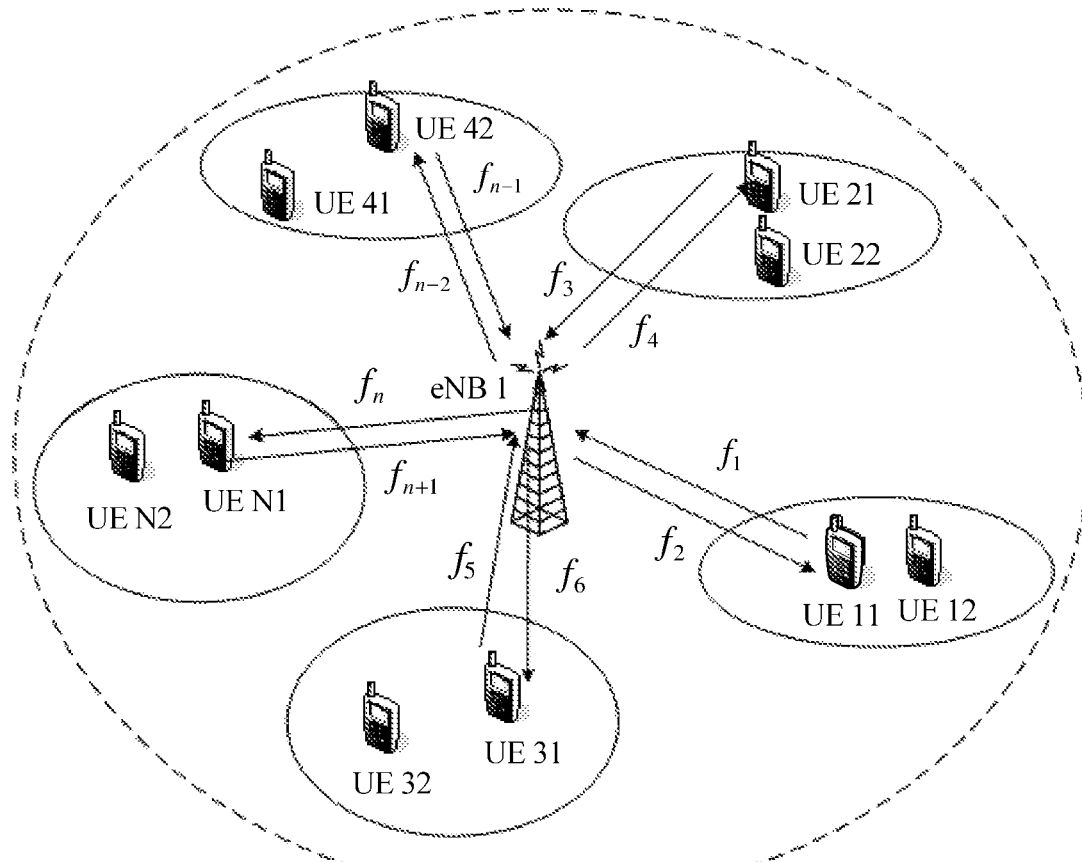
FIG. 8 is a schematic diagram of forming user groups according to interference between user equipments in a configuration method according to an embodiment of the present disclosure.

For example, in a possible implementation, as shown in FIG. 8, if an interference value between the user equipment UE 11 and the user equipment UE 12 is greater than or equal to the preset interference threshold, it is determined that interference exists between the user equipment UE 11 and the user equipment UE 12, and the user equipment UE 11 and the user equipment UE 12 are allocated to a same user group, that is, a first user group in FIG. 8. The user equipment UE 11 and the user equipment UE 12 are separately any user equipment in the first cell. Grouping of another user equipment is the same as grouping of the user equipment UE 11 and the user equipment UE 12. Details are not described in this embodiment of the present disclosure again. To maximize resource usage, in another aspect, the base station of the first cell may further obtain a geographical location of each user equipment in the first cell. The base station of the first cell allocates, to different user groups according to geographical locations of the user equipments in the first cell and interference powers between the user equipments, user equipments between which a distance is greater than a preset distance and an interference power is less than the preset interference threshold. Certainly, determining may be performed with reference to only the geographical location, and user equipments whose geographical locations are greater than a preset geographical location are allocated to different user groups. This is not limited in this embodiment of the present disclosure.

For user equipments that are relatively close to each other, uplink transmission greatly interferes with downlink receiving of another user equipment on a same frequency band. However, for user equipments that are relatively far away from each other, transmission performed by user equipment on the uplink frequency band f1 slightly interferes with receiving performed by another user equipment on the downlink frequency band f1. Therefore, user equipments between which a distance is less than the preset distance threshold and signal quality strength is less than preset quality strength are allocated to a same user group, so as to better eliminate interference between user equipments.

Further, when the base station groups the user equipments by using interference information of user equipments, for example, a manner shown in FIG. 8, the following manner may be used to determine whether interference exists between the first user group and the second user group in the first cell, and whether no interference exists between the third user group and the fourth user group.

B1. When interference exists between at least one user equipment in the first user group and at least one user equipment in the second user group, the base station determines that interference exists between the user equipment in the first user group and the user equipment in the second user group.

For example, if an interference power between the at least one user equipment in the first user group and the at least one of user equipments in the second user group is greater than the preset interference threshold, interference exists between the user equipment in the first user group and the user equipment in the second user group. That is, interference exists between the first user group and the second user group.

B2. When no interference exists between any user equipment in the third user group and any user equipment in the fourth user group, the base station determines that no interference exists between the user equipment in the third user group and the user equipment in the fourth user group.

For example, if an interference power between any user equipment in the third user group and any one of user equipments in the fourth user group is less than the preset interference threshold, no interference exists between the user equipment in the third user group and the user equipment in the fourth user group. That is, no interference exists between the third user group and the fourth user group.

Figure 9:
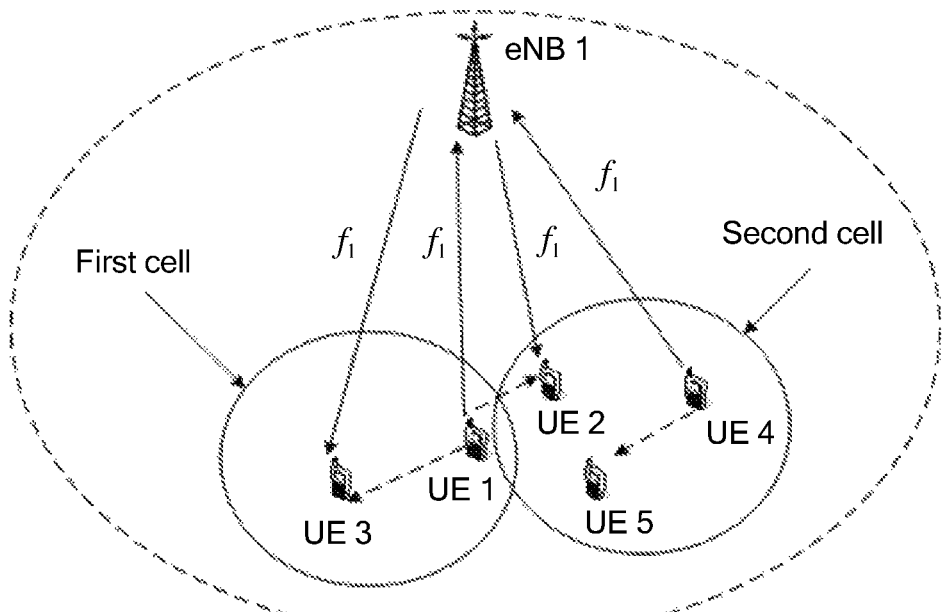
FIG. 9 is an application scenario 1 of a configuration method according to an embodiment of the present disclosure.

As shown in FIG. 9, in an actual application scenario, a possible scenario is that: Interference exists between cells that are adjacent to each other and that are covered by a same base station eNB 1. In addition, the same interference also occurs on a cell-edge user. All cells use a same frequency band. Therefore, for two edge users who are in two cells relatively close to each other, for example, the first cell and the second cell are cells adjacent to each other and covered by the base station eNB 1, because the first cell and the second cell use a same operating frequency band f1, the uplink frequency band f1 of edge user equipment UE 1 in the first cell interferes with the downlink frequency band f1 of edge user equipment UE 2 in the second cell. Interference between the user equipment in the first cell and the user equipment in the second cell may be eliminated with reference to the foregoing manner. Details are not described in this embodiment of the present disclosure again.

To reduce the interference caused by the uplink frequency band f1 of the edge user equipment UE 1 in the first cell to the downlink frequency band f1 of the edge user equipment UE 2 in the second cell, the following manner may be used for implementation in this embodiment of the present disclosure.

S1021A. The base station obtains configuration information of a second cell, where the configuration information of the second cell includes at least an uplink frequency band and a downlink frequency band of a user group that is in the second cell and that interferes with the first cell, and the second cell is a cell adjacent to the first cell.

In this embodiment of the present disclosure, that the base station obtains the configuration information of the second cell may include: The base station obtains the uplink frequency band and the downlink frequency band of the user group that is in the second cell and that interferes with the first cell, or the base station may obtain an uplink frequency band and a downlink frequency band of each user group in the second cell. This is not limited in this embodiment of the present disclosure.

The user group that is in the second cell and that interferes with the first cell may indicate that any user group in the second cell is adjacent to any user group in the first cell, or interference may exist between user equipment in any user group in the second cell and at least one user equipment in any user group in the first cell.

S1022B. If a fifth user group is a user group that is in the second cell and that interferes with the first cell, and an uplink frequency band of the fifth user group is the same as a downlink frequency band of a sixth user group in user groups that are in the first cell and that interfere with the second cell, adjust the downlink frequency band of the sixth user group, so that the downlink frequency band of the sixth user group is different from the uplink frequency band of the fifth user group.

Figure 10A:
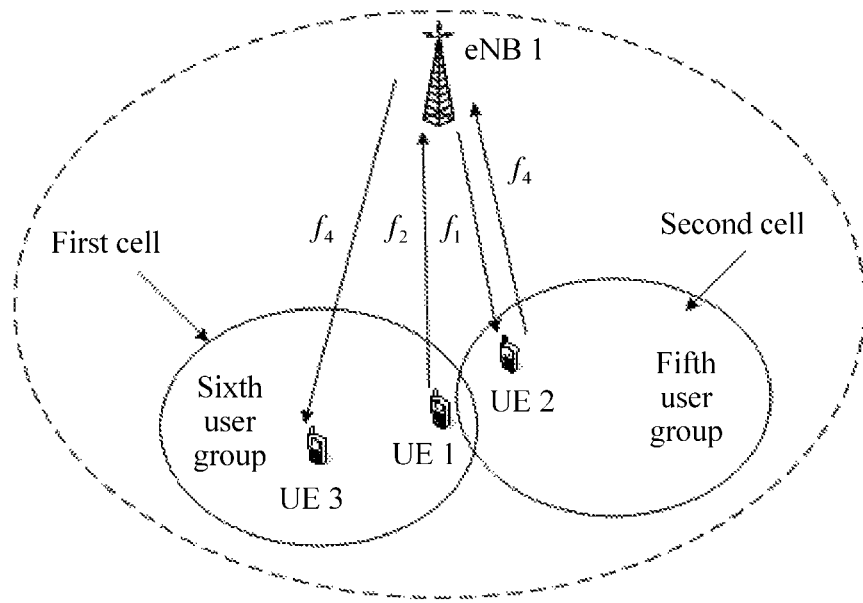
FIG. 10A is a schematic diagram of a first application scenario based on an application scenario 1 in a configuration method according to an embodiment of the present disclosure.
Figure 10B:
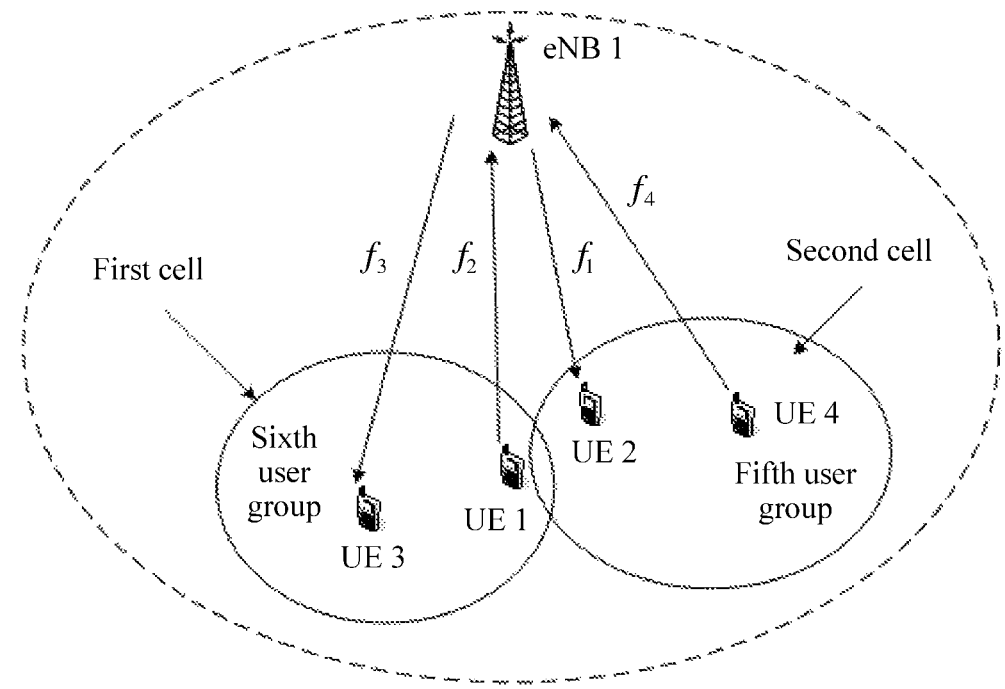
FIG. 10B is a schematic diagram of performing configuration in the first application scenario shown in FIG. 10A in a configuration method according to an embodiment of the present disclosure.

For example, as shown in FIG. 10A, user equipment UE 2 in the fifth user group in the second cell uses an uplink frequency band f4 for uplink transmission, and user equipment UE 1 in the sixth user group in the first cell uses a downlink frequency band f4 for downlink receiving. To reduce interference between the two cells adjacent to each other, an uplink frequency band that is used for uplink transmission and that is of the user equipment UE 1 in the sixth user group in the first cell may be adjusted to f3, as shown in FIG. 10B.

S1022C. If a seventh user group is a user group that is in the second cell and that interferes with the first cell, and a downlink frequency band of the seventh user group is the same as an uplink frequency band of an eighth user group in user groups that are in the first cell and that interfere with the second cell, adjust the uplink frequency band of the eighth user group, so that the uplink frequency band of the eighth user group is different from the downlink frequency band of the seventh user group.

Figure 10C:
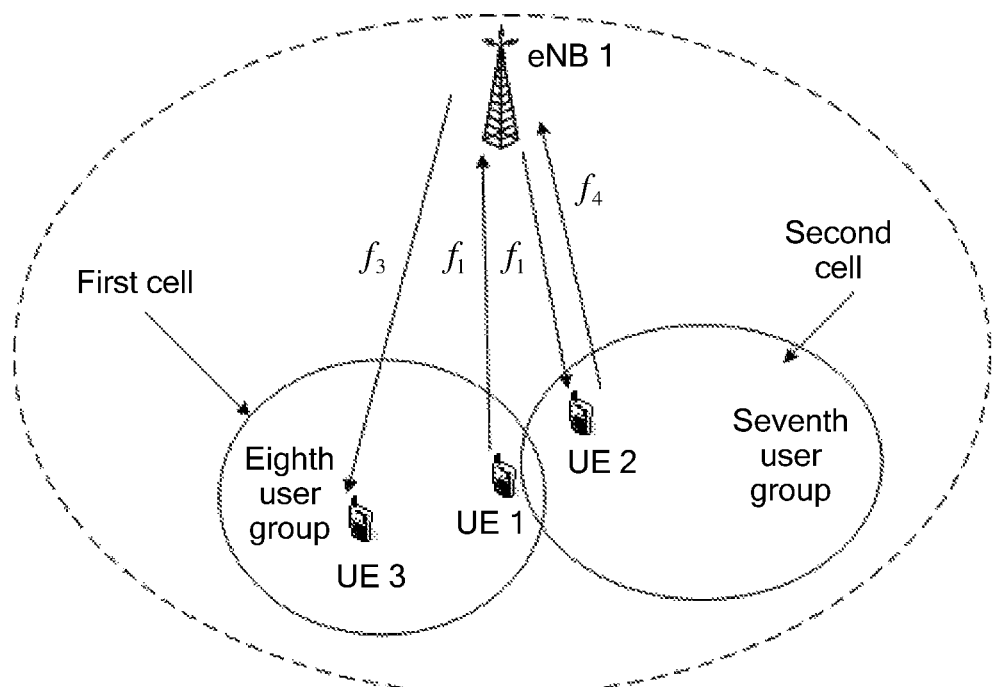
FIG. 10C is a schematic diagram of a second application scenario based on an application scenario 1 in a configuration method according to an embodiment of the present disclosure.
Figure 10D:
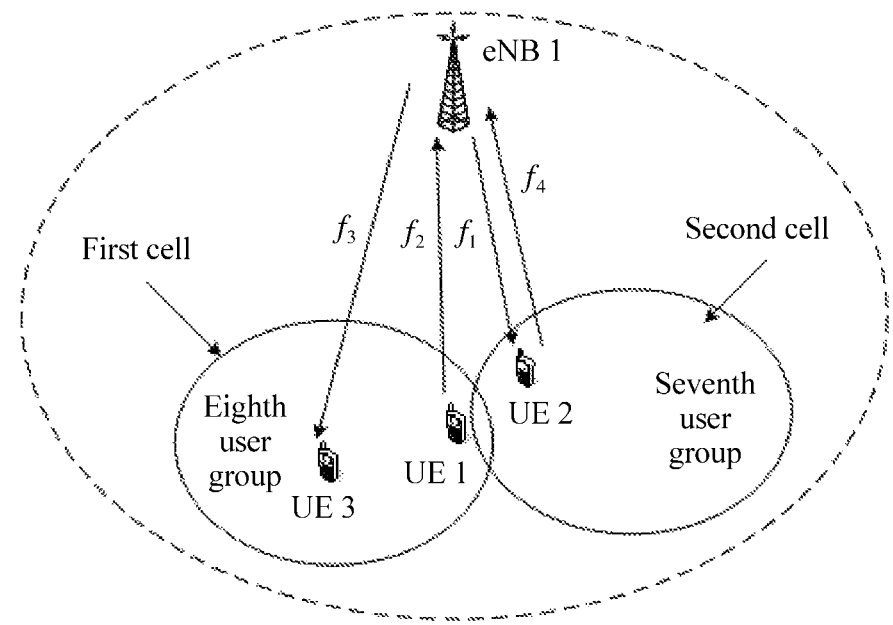
FIG. 10D is a schematic diagram of performing configuration in the first application scenario shown in FIG. 10B in a configuration method according to an embodiment of the present disclosure.

For example, as shown in FIG. 10C, user equipment UE 2 in the seventh user group in the second cell uses a downlink frequency band f1 for downlink receiving, and user equipment UE 1 in the eighth user group in the first cell uses an uplink frequency band f1 for uplink transmission. To reduce interference between the two cells adjacent to each other, the uplink frequency band f1 that is used for uplink transmission and that is of the user equipment UE 1 in the eighth user group in the first cell may be adjusted to f2, as shown in FIG. 10D.

In addition, if a thirteenth user group is a user group that is in the second cell and that interferes with the first cell, a downlink frequency band of the thirteenth user group is the same as an uplink frequency band of a fourteenth user group in user groups that are in the first cell and that interfere with the second cell, and a downlink frequency band of user equipment in the thirteenth user group is the same as an uplink frequency band of user equipment in the fourteenth user group, the uplink frequency band and a downlink frequency band of the fourteenth user group are adjusted, so that the uplink frequency band of the fourteenth user group is different from the downlink frequency band of the thirteenth user group, and the downlink frequency band of the fourteenth user group is different from an uplink frequency band of the thirteenth user group. For a specific adjustment manner, refer to the foregoing manner. Details are not described in this embodiment of the present disclosure again.

For example, user equipment in the thirteenth user group in the second cell uses a downlink frequency band f1 for downlink receiving, user equipment in the fourteenth user group in the first cell uses an uplink frequency band f1 for uplink transmission, user equipment in the thirteenth user group in the second cell uses an uplink frequency band f3 for uplink transmission, and user equipment in the fourteenth user group in the first cell uses a downlink frequency band f3 for downlink receiving. To reduce interference between the two cells adjacent to each other, the uplink frequency band f1 that is used for uplink transmission and that is of the user equipment in the fourteenth user group in the first cell may be adjusted to f2, and the downlink frequency band f3 that is used for downlink receiving and that is of user equipment in the fourteenth user group in the first cell may be adjusted to f4.

It should be noted that, in an actual application process, the uplink frequency band and the downlink frequency band of the second cell may be adjusted according to configuration information of the first cell. Therefore, for user groups that are in the first cell and the second cell and that interfere with each other, an uplink frequency band of a user group is different from a downlink frequency band of another user group, and a downlink frequency band of the user group is different from an uplink frequency band of the another user group. A specific adjustment manner and principle are the same as a manner and a principle of adjusting the first cell according to the second cell. Details are not described in this embodiment of the present disclosure again.

Figure 11:
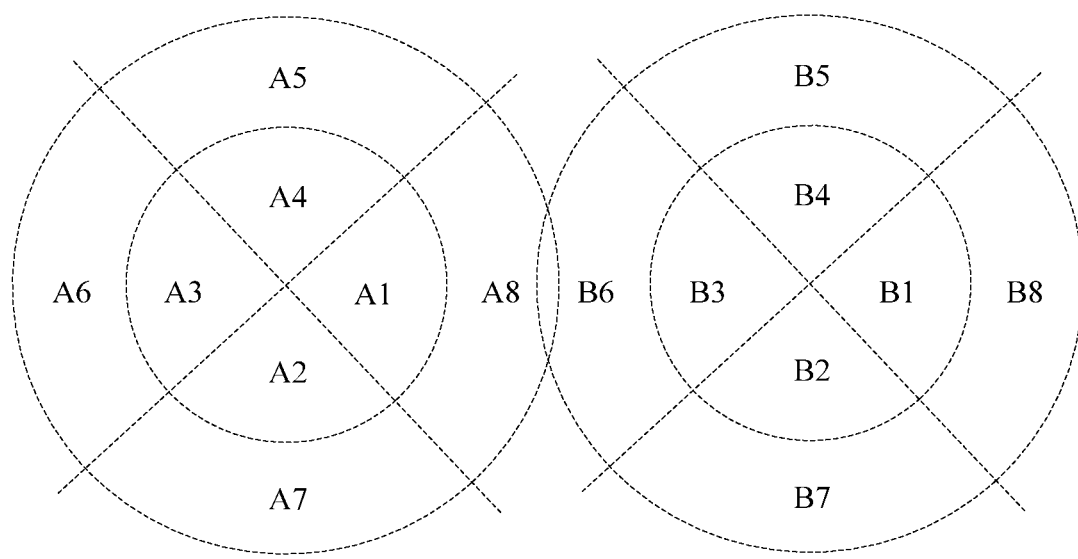
FIG. 11 is a schematic diagram of a user group obtained according to geographical location information and based on the scenario shown in FIG. 9 according to an embodiment of the present disclosure.

For example, as shown in FIG. 11, FIG. 11 is a schematic diagram of obtaining user groups according to geographical location information of user equipments in the first cell and the second cell obtained in FIG. 10A and FIG. 10D. It may be learned from FIG. 11 that a distance between a user group A8 in the first cell and a user group B6 in the second cell is less than a preset distance. If an uplink frequency band of the user group A8 in the first cell is the same as a downlink frequency band of the user group B6 in the second cell, or a downlink frequency band of the user group A8 in the first cell is the same as an uplink frequency band of the user group B6 in the second cell; or an uplink frequency band of the user group A8 in the first cell is the same as a downlink frequency band of the user group B6 in the second cell, and a downlink frequency band of the user group A8 in the first cell is the same as an uplink frequency band of the user group B6 in the second cell, user equipment in the user group A8 in the first cell may interfere with user equipment in the user group B6 in the second cell. To avoid the interference, an uplink frequency band and a downlink frequency band of each user group in the first cell may be adjusted according to a downlink frequency band and an uplink frequency band of a user group that is in the second cell and that interferes with the first cell, so as to avoid interference between user groups that are in cells adjacent to each other and between which a distance is less than the preset distance. For example, when frequency band allocation of the second cell is shown in Table 2, frequency bands of all user groups in the first cell may be adjusted to frequency bands shown in Table 3.

TABLE 2

Frequency band allocation of the second cell

|  | User group | | | | | | | |
| --- | --- | --- | --- | --- | --- | --- | --- | --- |
|  | B1 | B2 | B3 | B4 | B5 | B6 | B7 | B8 |
| Uplink frequency band | f1 | f2 | f3 | f4 | f5 | f6 | f7 | f8 |
| Downlink frequency band | f6 | f5 | f8 | f7 | f2 | f1 | f4 | f3 |

TABLE 3

Frequency bands of the first cell that are obtained after adjustment according to frequency bands of the second cell

|  | User group | | | | | | | |
| --- | --- | --- | --- | --- | --- | --- | --- | --- |
|  | A1 | A2 | A3 | A4 | A5 | A6 | A7 | A8 |
| Uplink frequency band | f8 | f1 | f2 | f3 | f4 | f5 | f6 | f7 |
| Downlink frequency band | f3 | f6 | f5 | f8 | f7 | f2 | f1 | f4 |

With reference to Table 2 and Table 3, it may be learned that when the uplink frequency band and the downlink frequency band of the user group B6 in the second cell are respectively f6 and f1, the uplink frequency band of the user group A8 in the first cell may be adjusted to any one of f1 to f5 or f7 and f8, and the downlink frequency band of the user group A8 in the first cell may be adjusted to any one of f2 to f8. For example, description is provided in this embodiment of the present disclosure by using an example in which the uplink frequency band is f7 and the downlink frequency band is f6. When frequency band configuration of the user group A8 is obtained, an uplink frequency band and a downlink frequency band of another user group in the first cell may be configured as other frequency bands different from the uplink frequency band and the downlink frequency band of the user group A8. For a specific configuration manner, refer to the foregoing configuration manner of the user groups in the first cell. Details are not described in this embodiment of the present disclosure again.

Figure 12:
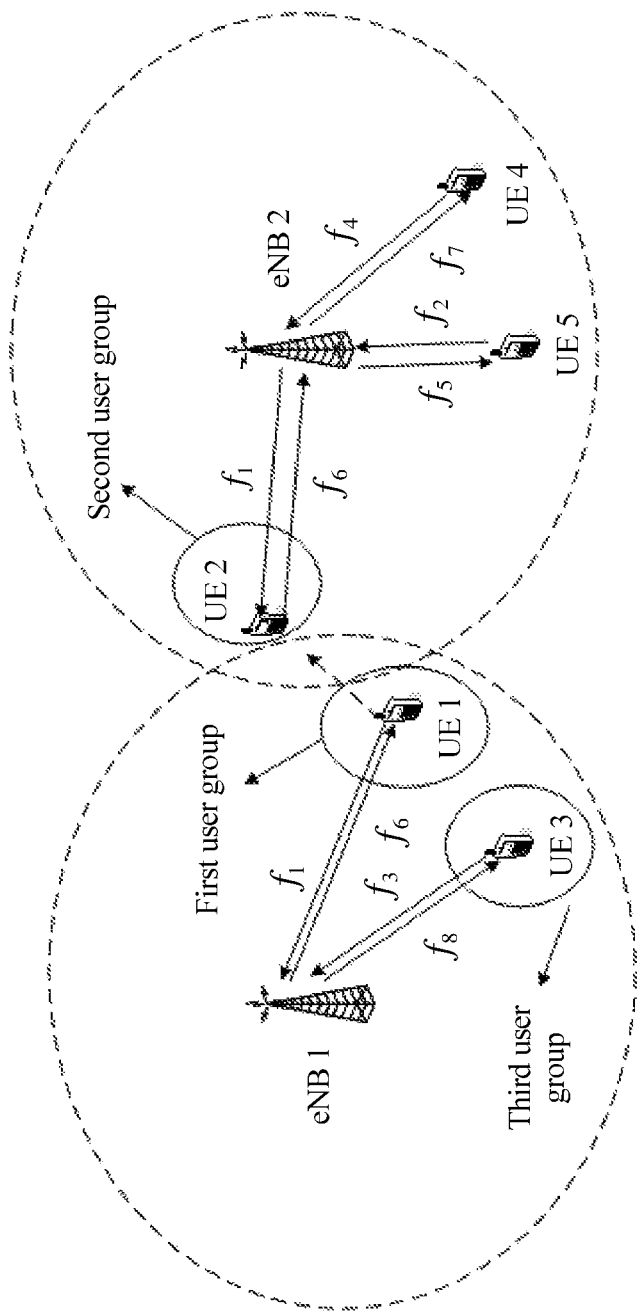
FIG. 12 is an application scenario 2 of a configuration method according to an embodiment of the present disclosure.

In another possible scenario, as shown in FIG. 12, the same interference also occurs on a cell-edge user. All cells use a same frequency band. For two edge users who are in two cells relatively close to each other, for example, the first cell and the second cell are cells adjacent to each other and separately covered by different base stations, interference exists between the first user group in the first cell and the second user group in the second cell. To reduce the interference between the first user group in the first cell and the second user group in the second cell, the base station eNB 1 of the first cell may obtain, from a base station eNB 2 of the second cell, an uplink frequency band and a downlink frequency band of a user group that is in the second cell and that interferes with the first cell, or obtain an uplink frequency band and a downlink frequency band of each user group in the second cell. After the uplink frequency band and the downlink frequency band of the second cell are obtained, an uplink frequency band and a downlink frequency band of each user group in the first cell are adjusted. In this way, an uplink frequency band of a user group that is in the first cell and that interferes with the second cell is different from a downlink frequency band of a user group that is in the second cell and that interferes with the first cell, and a downlink frequency band of a user group that is in the first cell and that interferes with the second cell is different from an uplink frequency band of a user group that is in the second cell and that interferes with the first cell. For a specific adjustment manner, refer to the adjustment manner in the foregoing scenario. Details are not described in this embodiment of the present disclosure again.

A manner in which the base station eNB 1 of the first cell obtains the uplink frequency band and the downlink frequency band of the second cell from the base station eNB 2 of the second cell is not limited in this embodiment of the present disclosure.

For example, a first possible implementation is as follows:

a1. The base station of the first cell sends a first request message to the base station eNB 2 of the second cell by using network interface signaling, where the first request message instructs the base station eNB 2 to send an uplink frequency band and a downlink frequency band of each user group in the second cell to the base station eNB 1, or instructs the base station eNB 2 to send, to the base station eNB 1, an uplink frequency band and a downlink frequency band of each user group that is in the second cell and that interferes with the first cell.

a2. The base station eNB 1 of the first cell receives a feedback message that is of the first request message and that is sent by the base station eNB 2 of the second cell, where the feedback message carries an uplink frequency band and a downlink frequency band of each user group in the second cell or an uplink frequency band and a downlink frequency band of a user group that is in the second cell and that interferes with the first cell.

For example, a second possible implementation is as follows:

The base station eNB 1 receives a second request message sent by the base station eNB 2, where the second request message carries an uplink frequency band and a downlink frequency band of each user group in the second cell or an uplink frequency band and a downlink frequency band of a user group that is in the second cell and that interferes with the first cell.

The second possible implementation is learned by default by the base stations. After a base station completes configuration of each cell covered by the base station, the base station directly exchanges data with another neighboring base station.

Figure 13:
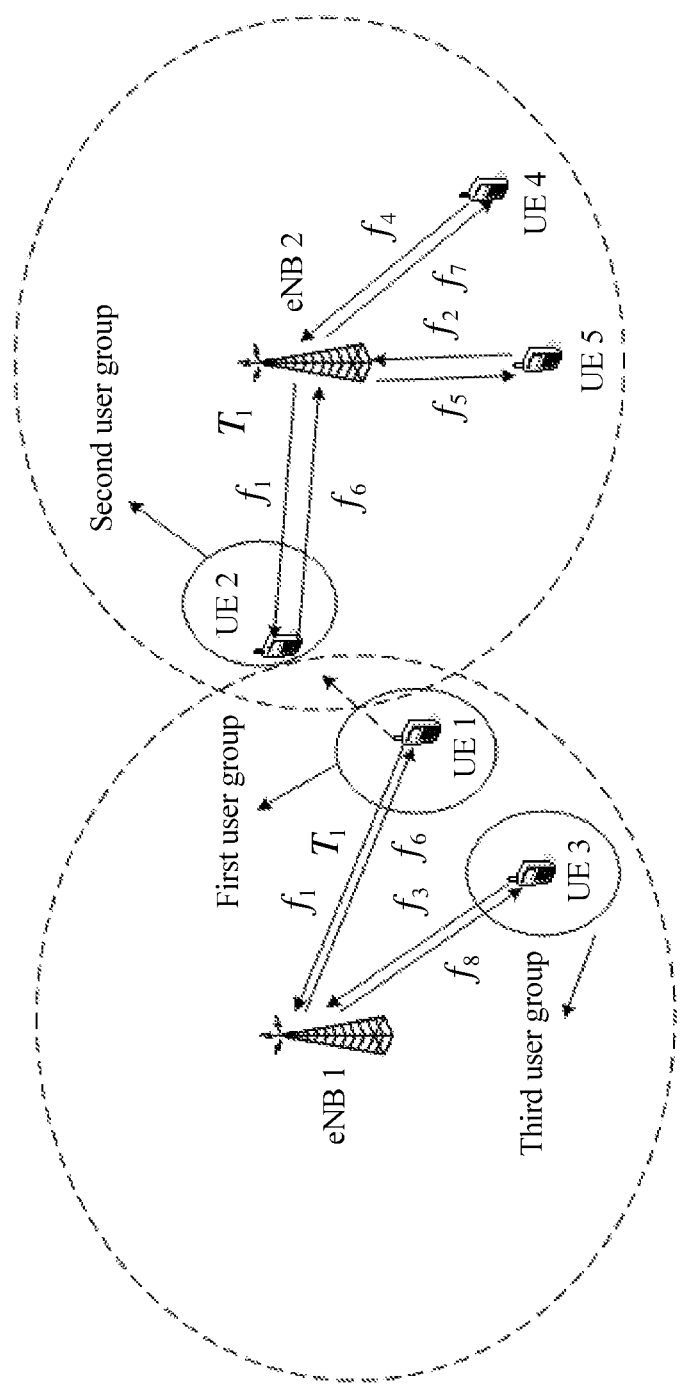
FIG. 13 is an application scenario 3 of a configuration method according to an embodiment of the present disclosure.

As shown in FIG. 13, FIG. 13 is a third possible scenario according to this embodiment of the present disclosure. A first cell and a third cell are cells that are adjacent to each other and that are covered by different base stations. An uplink frequency band of UE 1 in a first user group in the first cell is the same as a downlink frequency band of UE 2 in a second user group in the third cell. In addition, a downlink frequency band of the UE 1 in the first user group in the first cell is the same as an uplink frequency band of UE 2 in the second user group in the third cell.

To reduce interference caused by the uplink frequency band of the UE 1 in the first user group in an area covered by both the first cell and the third cell to the downlink frequency band of the UE 2 in the second user group in the third cell, for example, a possible implementation is shown by using the following steps b1 and b2.

b1. The base station obtains configuration information of the third cell, where the configuration information of the third cell includes at least an uplink frequency band, a downlink frequency band, and time scheduling information of a user group that is in the third cell and that interferes with the first cell, and the third cell is a cell adjacent to the first cell.

A manner in which the base station obtains the configuration information sent by the third cell is not limited in this embodiment of the present disclosure. When the third cell and the first cell are cells covered by different base stations, for example, an eNB 1 and an eNB 2 shown in FIG. 13, for example, a possible implementation is as follows:

In a case in which the implementation is learned by default by the base stations, the base station may obtain a cell-ID of a neighboring base station. After the base station eNB 2 of the third cell completes configuration on each user group in the third cell, the base station eNB 2 of the third cell directly sends an uplink frequency band, a downlink frequency band, and time scheduling information of each user group in the third cell to the base station eNB 1 of the first cell, or sends, to the base station eNB 1 of the first cell, the uplink frequency band, the downlink frequency band, and the time scheduling information of the user group that is in the third cell and that interferes with the first cell.

For example, another possible implementation is as follows:

The base station eNB 1 sends a third request message to the base station eNB 2 of the third cell. The third request message instructs the base station eNB 2 of the third cell to send an uplink frequency band, a downlink frequency band, and time scheduling information of each user group in the third cell to the base station eNB 1 of the first cell, or send, to the base station eNB 1 of the first cell, the uplink frequency band, the downlink frequency band, and the time scheduling information of the user group that is in the third cell and that interferes with the first cell. Then, the base station eNB 1 of the first cell receives a feedback message that is of the third request message and that is sent by the base station eNB 2 of the third cell. The feedback message of the third request message carries an uplink frequency band, a downlink frequency band, and time scheduling information of each user group in the third cell, or the uplink frequency band, the downlink frequency band, and the time scheduling information of the user group that is in the third cell and that interferes with the first cell.

b2. If a ninth user group is a user group that is in the third cell and that interferes with the first cell, and an uplink frequency band of the ninth user group is the same as a downlink frequency band of a tenth user group in the first cell, adjust a scheduling time of the tenth user group to a scheduling time different from a scheduling time of the ninth user group, where the ninth user group belongs to the third cell, and the tenth user group belongs to the first cell.

For example, if the scheduling time of the ninth user group in the third cell is T1, the scheduling time of the tenth user group in the first cell may be adjusted to T2, where T1 and T2 are different moments.

b3. If an eleventh user group is a user group that is in the third cell and that interferes with the first cell, and a downlink frequency band of the eleventh user group is the same as an uplink frequency band of a twelfth user group in the first cell, adjust a scheduling time of the twelfth user group to a scheduling time different from a scheduling time of the eleventh user group, where the twelfth user group belongs to the first cell, and the eleventh user group belongs to the third cell.

For example, if the scheduling time of the eleventh user group in the third cell is T3, the scheduling time of the twelfth user group in the first cell may be adjusted to T4, where T3 and T4 are different moments.

b4. If a fifteenth user group is a user group that is in the third cell and that interferes with the first cell, a downlink frequency band of the fifteenth user group is the same as an uplink frequency band of a sixteenth user group in the first cell, and an uplink frequency band of the fifteenth user group is the same as a downlink frequency band of the sixteenth user group in the first cell, adjust a scheduling time of the sixteenth user group to a scheduling time different from a scheduling time of the fifteenth user group, where the sixteenth user group belongs to the first cell, and the fifteenth user group belongs to the third cell.

For example, if the scheduling time of the fifteenth user group in the third cell is T5, the scheduling time of the sixteenth user group in the first cell may be adjusted to T6, where T5 and T6 are different moments.

The foregoing manner in this embodiment may be used to determine whether interference exists between the ninth user group, the eleventh user group, or the fifteenth user group and any user group in the first cell. Details are not described in this embodiment of the present disclosure again.

The third possible scenario in this embodiment of the present disclosure shown in FIG. 13 may be further implemented in the following manner.

c1. The base station sends configuration information of the first cell to a base station of a fourth cell, where the configuration information of the first cell includes at least an uplink frequency band, a downlink frequency band, and time scheduling information of a user group that is in the first cell and that interferes with the fourth cell.

When receiving the configuration information of the first cell, the base station of the fourth cell may perform configuration according to the configuration information of the first cell. If a seventeenth user group is a user group that is in the fourth cell and that interferes with the first cell, and an uplink frequency band of the seventeenth user group is the same as a downlink frequency band of an eighteenth user group in the first cell, the base station of the fourth cell adjusts a scheduling time of the seventeenth user group to a scheduling time different from a scheduling time of the eighteenth user group; or If a nineteenth user group is a user group that is in the fourth cell and that interferes with the first cell, and a downlink frequency band of the nineteenth user group is the same as an uplink frequency band of a twentieth user group in the first cell, the base station of the fourth cell adjusts a scheduling time of the nineteenth user group to a scheduling time different from a scheduling time of the twentieth user group; or If a twenty-first user group is a user group that is in the fourth cell and that interferes with the first cell, and a downlink frequency band of the twenty-first user group is the same as an uplink frequency band of a twenty-second user group in the first cell, where an uplink frequency band of the twenty-first user group is the same as a downlink frequency band of the twenty-second user group in the first cell, the base station of the fourth cell adjusts a scheduling time of the twenty-first user group to a scheduling time different from a scheduling time of the twenty-second user group.

The configuration information of the first cell may include an uplink frequency band, a downlink frequency band, and time scheduling information of each user group in the first cell, or may include only an uplink frequency band, a downlink frequency band, and time scheduling information of a user group that is in the first cell and that interferes with the fourth cell. This is not limited in this embodiment of the present disclosure.

The fourth cell is a cell that is adjacent to the first cell and that is covered by a base station different from the base station that covers the first cell.

That the configuration information of the first cell is sent to the fourth cell may be as follows: After receiving a fourth request message sent by the base station of the fourth cell, the base station of the first cell sends configuration information of the first cell to the fourth cell. The fourth request message instructs the base station of the first cell to send, to the base station of the fourth cell, at least an uplink frequency band, a downlink frequency band, and time scheduling information of a user group that is in the first cell and that interferes with the fourth cell. Alternatively, the fourth request message instructs the base station of the first cell to send an uplink frequency band, a downlink frequency band, and time scheduling information of each user group in the first cell to the base station of the fourth cell.

Alternatively, an uplink frequency band, a downlink frequency band, and time scheduling information of each user group in the first cell may be directly sent to the base station of the fourth cell after the first cell completes configuration of the uplink frequency band, the downlink frequency band, and the time scheduling information of each user group in the first cell; or only an uplink frequency band, a downlink frequency band, and time scheduling information of a user group that is in the first cell and that interferes with the fourth cell is sent to the fourth cell. This is not limited in this embodiment of the present disclosure.

Figure 14:
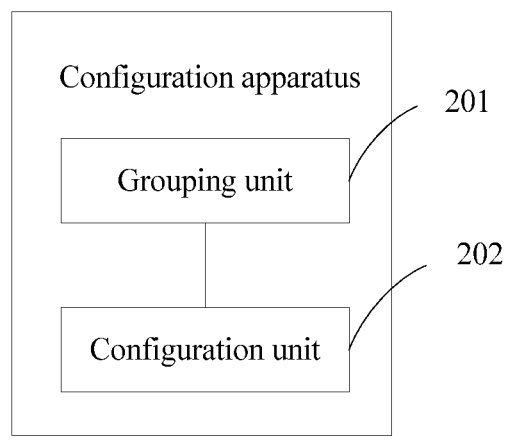
FIG. 14 is a schematic structural diagram 1 of a configuration method according to an embodiment of the present disclosure.

An embodiment of the present disclosure further provides a configuration apparatus. Each functional unit in the configuration apparatus is corresponding to the configuration method in the foregoing embodiment of the present disclosure. For details, refer to description in the foregoing embodiment of the present disclosure. Details are not described in this embodiment of the present disclosure again. As shown in FIG. 14, the configuration apparatus 20 is applied to a full-duplex system, including:

a grouping unit 201, configured to divide user equipments in a first cell into N user groups, where N is a positive integer greater than or equal to 2, interference exists between user equipments in each of the N user groups, and existence of the interference indicates that when user equipment performs uplink transmission, downlink receiving performed by another user equipment in a co-time and co-frequency manner is interfered; and a configuration unit 202, configured to configure, for user equipment in each of the N user groups, an uplink frequency band used for uplink transmission and a downlink frequency band used for downlink receiving, where the uplink frequency band is different from the downlink frequency band in a same user group, and the uplink frequency band and the downlink frequency band are frequency sub-bands of an operating frequency band of the full-duplex system.

According to the configuration apparatus provided in this embodiment of the present disclosure, the grouping unit divides the user equipments in the first cell into the N user groups, and separately configures, for the user equipment in each user group, the uplink frequency band used for uplink transmission and the downlink frequency band used for downlink receiving. Because interference exists between the user equipments in each user group, when an uplink frequency band and a downlink frequency band in different frequency bands are configured for user equipments in a same user group, interference caused by uplink transmission of user equipment in the user group to downlink receiving of another user equipment in the user group can be avoided. In addition, the uplink frequency band and the downlink frequency band are the frequency sub-bands of the operating frequency band of the full-duplex system, so that the base station can provide an uplink transmission service and a downlink receiving service for different user equipments in the first cell in the full-duplex system on different frequency sub-bands of a same operating frequency band.

Further, the N user groups include a first user group and a second user group, and interference exists between user equipment in the first user group and user equipment in the second user group.

The configuration unit 202 is specifically configured to:

configure an uplink frequency band of the first user group and a downlink frequency band of the second user group as different frequency bands, and configure a downlink frequency band of the first user group and an uplink frequency band of the second user group as different frequency bands.

Further, the N user groups include a third user group and a fourth user group, and no interference exists between user equipment in the third user group and user equipment in the fourth user group.

The configuration unit 202 is further configured to:

configure an uplink frequency band of the third user group and a downlink frequency band of the fourth user group as a same frequency band, and configure a downlink frequency band of the third user group and an uplink frequency band of the fourth user group as a same frequency band.

Figure 15:
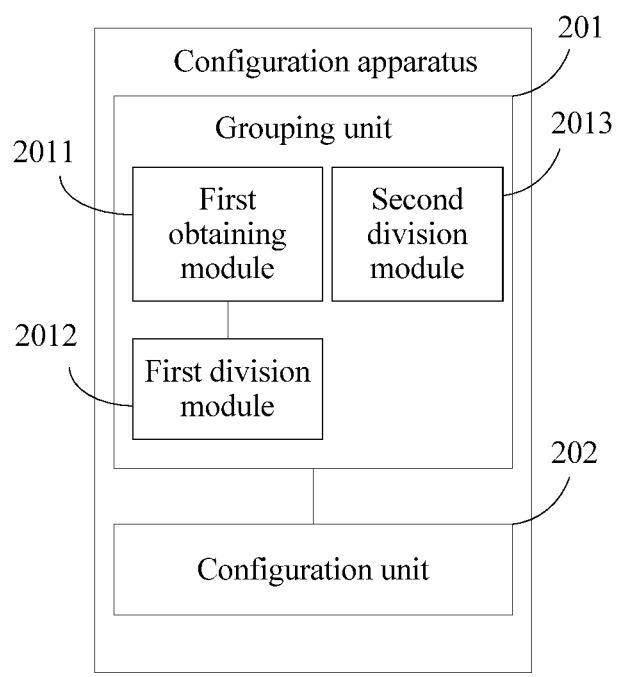
FIG. 15 is a schematic structural diagram 2 of a configuration method according to an embodiment of the present disclosure.

As shown in FIG. 15, the grouping unit 201 includes:

a first obtaining module 2011, configured to obtain geographical location information of the user equipments in the first cell; and a first division module 2012, configured to divide the user equipments in the first cell into the N user groups according to the geographical location information of the user equipments.

Further, the apparatus further includes:

a first judging unit, configured to determine whether the first user group is adjacent to the second user group;

a first determining unit, configured to: when the first judging unit determines that the first user group is adjacent to the second user group, determine, by the base station, that interference exists between the user equipment in the first user group and the user equipment in the second user group; and a second determining unit, configured to: when the first judging unit determines that the third user group is not adjacent to the fourth user group, determine, by the base station, that no interference exists between the third user group and the fourth user group.

The first determining unit and the second determining unit in this embodiment of the present disclosure may be two independent units, or may be integrated into a determining unit. The judging unit has functions of the first determining unit and the second determining unit. This is not limited in this embodiment of the present disclosure.

Further, as shown in FIG. 15, the division unit 201 further includes:

a second division module 2013, configured to divide the user equipments into the N user groups according to interference information between the user equipments in the first cell, where interference exists between any one of user equipments in a user group and at least one user equipment in the same user group.

Further, the apparatus further includes:

a second judging unit, configured to determine whether the first user group includes at least one user equipment that interferes with at least one user equipment in the second user group;

a third determining unit, configured to: when the second judging unit determines that interference exists between the at least one user equipment in the first user group and the at least one user equipment in the second user group, determine, by the base station, that interference exists between the user equipment in the first user group and the user equipment in the second user group;

a third judging unit, configured to determine whether no interference exists between any user equipment in the third user group and any user equipment in the fourth user group; and a fourth determining unit, configured to: when the third judging unit determines that no interference exists between any user equipment in the third user group and any user equipment in the fourth user group, determine, by the base station, that no interference exists between the user equipment in the third user group and the user equipment in the fourth user group.

It should be noted that the second judging unit and the third judging unit in this embodiment of the present disclosure may be two independent units, or may be integrated into a judging unit. The judging unit has functions of the second judging unit and the third judging unit.

The third determining unit and the fourth determining unit in this embodiment of the present disclosure may be two independent units, or may be integrated into a determining unit. The judging unit has functions of the third determining unit and the fourth determining unit.

Further, the apparatus further includes:

a first obtaining unit, configured to: obtain configuration information of a second cell, where the configuration information of the second cell includes at least an uplink frequency band and a downlink frequency band of a user group that is in the second cell and that interferes with the first cell, and the second cell is a cell adjacent to the first cell;

a first adjusting unit, configured to:

if a fifth user group is a user group that is in the second cell and that interferes with the first cell, and an uplink frequency band of the fifth user group is the same as a downlink frequency band of a sixth user group in user groups that are in the first cell and that interfere with the second cell, adjust the downlink frequency band of the sixth user group, so that the downlink frequency band of the sixth user group is different from the uplink frequency band of the fifth user group; or if a seventh user group is a user group that is in the second cell and that interferes with the first cell, and a downlink frequency band of the seventh user group is the same as an uplink frequency band of an eighth user group in user groups that are in the first cell and that interfere with the second cell, adjust the uplink frequency band of the eighth user group, so that the uplink frequency band of the eighth user group is different from the downlink frequency band of the seventh user group; or if a thirteenth user group is a user group that is in the second cell and that interferes with the first cell, a downlink frequency band of the thirteenth user group is the same as an uplink frequency band of a fourteenth user group in user groups that are in the first cell and that interfere with the second cell, and a downlink frequency band of user equipment in the thirteenth user group is the same as an uplink frequency band of user equipment in the fourteenth user group, adjust the uplink frequency band and a downlink frequency band of the fourteenth user group, so that the uplink frequency band of the fourteenth user group is different from the downlink frequency band of the thirteenth user group, and the downlink frequency band of the fourteenth user group is different from an uplink frequency band of the thirteenth user group. For a specific adjustment manner, refer to the foregoing manner. Details are not described in this embodiment of the present disclosure again.

Further, the apparatus further includes:

a second obtaining unit, configured to obtain configuration information of a third cell, where the configuration information of the third cell includes at least an uplink frequency band, a downlink frequency band, and time scheduling information of a user group that is in the third cell and that interferes with the first cell, and the third cell is a cell adjacent to the first cell; and a second adjusting unit, configured to:

if a ninth user group is a user group that is in the third cell and that interferes with the first cell, and an uplink frequency band of the ninth user group is the same as a downlink frequency band of a tenth user group in the first cell, adjust a scheduling time of the tenth user group to a scheduling time different from a scheduling time of the ninth user group, where the ninth user group belongs to the third cell, and the tenth user group belongs to the first cell; or if an eleventh user group is a user group that is in the third cell and that interferes with the first cell, and a downlink frequency band of the eleventh user group is the same as an uplink frequency band of a twelfth user group in the first cell, adjust a scheduling time of the twelfth user group to a scheduling time different from a scheduling time of the eleventh user group, where the twelfth user group belongs to the first cell, and the eleventh user group belongs to the third cell; or if a fifteenth user group is a user group that is in the third cell and that interferes with the first cell, a downlink frequency band of the fifteenth user group is the same as an uplink frequency band of a sixteenth user group in the first cell, and an uplink frequency band of the fifteenth user group is the same as a downlink frequency band of the sixteenth user group in the first cell, adjust a scheduling time of the sixteenth user group to a scheduling time different from a scheduling time of the fifteenth user group, where the sixteenth user group belongs to the first cell, and the fifteenth user group belongs to the third cell.

Further, the apparatus further includes:

a sending unit, configured to: send, by the base station, configuration information of the first cell to a base station of a fourth cell, where the configuration information of the first cell includes at least an uplink frequency band, a downlink frequency band, and time scheduling information of a user group that is in the first cell and that interferes with the fourth cell.

Figure 16:
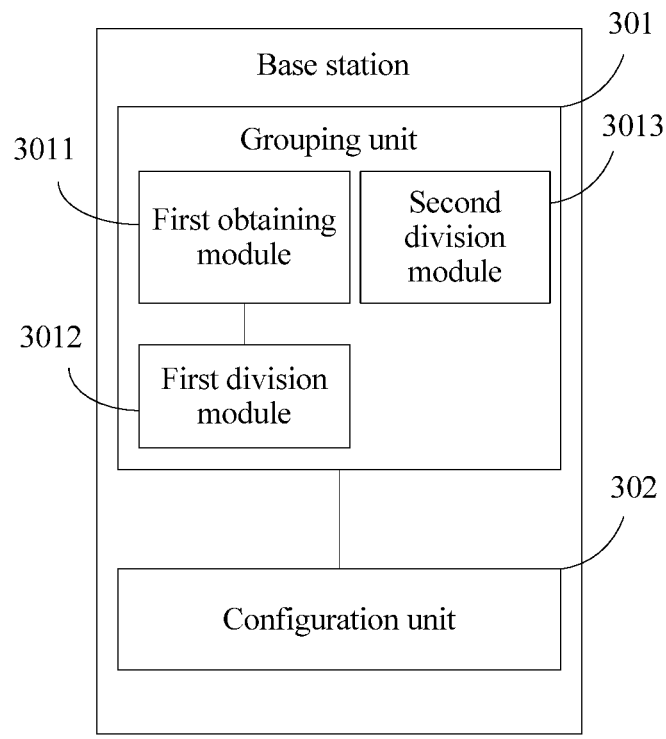
FIG. 16 is a schematic structural diagram of a base station according to an embodiment of the present disclosure.

As shown in FIG. 16, an embodiment of the present disclosure further provides a base station. The base station is configured to perform the steps performed by the base station in the foregoing method. The base station may include a module corresponding to a corresponding step. For example, the base station includes:

a grouping unit 301, configured to divide user equipments in a first cell into N user groups, where N is a positive integer greater than or equal to 2, interference exists between user equipments in each of the N user groups, and existence of the interference indicates that when user equipment performs uplink transmission, downlink receiving performed by another user equipment in a co-time and co-frequency manner is interfered; and a configuration unit 302, configured to configure for user equipment in each of the N user groups, an uplink frequency band used for uplink transmission and a downlink frequency band used for downlink receiving, where the uplink frequency band is different from the downlink frequency band in a same user group, and the uplink frequency band and the downlink frequency band are frequency sub-bands of an operating frequency band of a full-duplex system.

According to the base station provided in this embodiment of the present disclosure, the base station divides the user equipments in the first cell into the N user groups by using the grouping unit, and separately configures, for the user equipment in each user group, the uplink frequency band used for uplink transmission and the downlink frequency band used for downlink receiving. Because interference exists between the user equipments in each user group, when an uplink frequency band and a downlink frequency band in different frequency bands are configured for user equipments in a same user group, interference caused by uplink transmission of user equipment in the user group to downlink receiving of another user equipment in the user group can be avoided. In addition, the uplink frequency band and the downlink frequency band are the frequency sub-bands of the operating frequency band of the full-duplex system, so that the base station can provide an uplink transmission service and a downlink receiving service for different user equipments in the first cell in the full-duplex system on different frequency sub-bands of a same operating frequency band.

Figure 17:
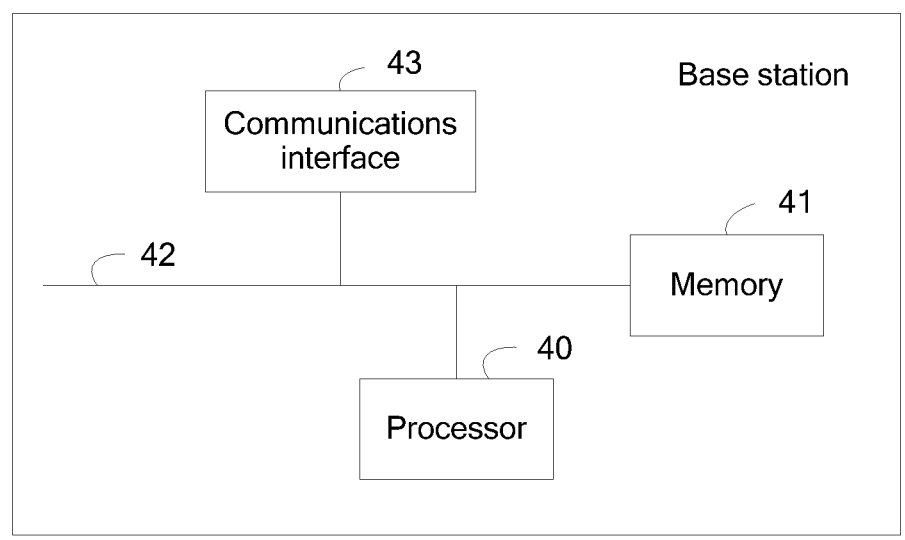
FIG. 17 is a schematic diagram of hardware of a base station according to an embodiment of the present disclosure.

As shown in FIG. 17, an embodiment of the present disclosure provides a base station. The base station includes a processor 40, a memory 41, a system bus 42, and a communications interface 43.

The memory 41 is configured to store a computer executable instruction. The processor 40 is connected to the memory 41 by using the system bus 42. When the base station runs, the processor 40 executes the computer executable instruction stored in the memory 41, so that the base station performs the configuration method in any one of FIG. 3 to FIG. 13. For a specific configuration method, refer to related description in the embodiment shown in any one of FIG. 3 to FIG. 13. Details are not described herein again.

According to the base station provided in this embodiment of the present disclosure, the base station divides user equipments in a first cell into N user groups by using a grouping unit, and separately configures, for user equipment in each user group, an uplink frequency band used for uplink transmission and a downlink frequency band used for downlink receiving. Because interference exists between the user equipments in each user group, when an uplink frequency band and a downlink frequency band in different frequency bands are configured for user equipments in a same user group, interference caused by uplink transmission of user equipment in the user group to downlink receiving of another user equipment in the user group can be avoided. In addition, the uplink frequency band and the downlink frequency band are frequency sub-bands of an operating frequency band of a full-duplex system, so that the base station can provide an uplink transmission service and a downlink receiving service for different user equipments in the first cell in the full-duplex system on different frequency sub-bands of a same operating frequency band.

This embodiment further provides a storage medium. The storage medium may include the memory 41.

The processor 40 may be a CPU. The processor 40 may be further another general purpose processor, a DSP, an ASIC, an FPGA, another programmable logic device, a discrete gate or a transistor logic device, a discrete hardware component, or the like. The general purpose processor may be a microprocessor or the processor may be any normal processor, or the like.

The processor 40 may be a dedicated processor. The dedicated processor may include at least one of a baseband processing chip, a radio frequency processing chip, and the like. Further, the dedicated processor may further include a chip with another dedicated processing function of a base station.

The memory 41 may include a volatile memory, for example, a random access memory RAM. The memory 41 may further include a nonvolatile memory, for example, a read-only memory ROM, a flash memory, an HDD, or an SSD. The memory 41 may further include a combination of the foregoing memories.

The system bus 42 may include a data bus, a power bus, a control bus, a signal status bus, and the like. For clarity of description in this embodiment, various buses are marked as the system bus 42 in FIG. 17.

The communications bus 43 may be specifically a transceiver in the base station. The transceiver may be a wireless transceiver. For example, the wireless transceiver may be an antenna of the base station, or the like. The processor 40 performs data transmission and receiving with another device, for example, the terminal, by using the communications bus 43.

In a specific implementation process, each step in the method procedure shown in any one of FIG. 3 to FIG. 13 may be implemented by executing the computer executable instruction stored in the memory 41 in a form of software by the processor 40 in a form of hardware. To avoid repetition, details are not described herein again.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of a software functional unit.

When the integrated unit is implemented in the form of a software functional unit and sold or used as an independent product, the integrated unit may be stored in a computer-readable storage medium. Based on such an understanding, all or parts of the technical solutions may be implemented in a form of a software product. The computer software product is stored in a storage medium, and includes several instructions for instructing a computer device (which may be a personal computer, a server, or a network device) or a processor to perform all or some of the steps of the methods described in the embodiments of the present disclosure. The storage medium is a non-transitory medium, and includes any medium that can store program code, such as a flash memory, a removable hard disk, a read-only memory, a random access memory, a magnetic disk, or an optical disc.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

Finally, it should be noted that the foregoing embodiments are merely intended for describing the technical solutions of the present disclosure but not for limiting the present disclosure. Although the present disclosure is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A configuration method, comprising:
dividing, by a base station in a full-duplex system, user equipments in a first cell into N user groups, wherein N is a positive integer greater than or equal to 2;
configuring, by the base station for a first user group in the N user groups, an uplink frequency band used for uplink transmission and a downlink frequency band used for downlink receiving, wherein within the first user group, the uplink frequency band is different from the downlink frequency band, and the uplink frequency band and the downlink frequency band are frequency sub-bands of an operating frequency band of the full-duplex system;
obtaining, by the base station, configuration information of a second cell, wherein the configuration information of the second cell comprises at least an uplink frequency band and a downlink frequency band of an additional user group that is in the second cell; and
adjusting, by the base station, at least one of the uplink frequency band or the downlink frequency band for the first user group based on the configuration information of the second cell, wherein the uplink frequency band is adjusted when the downlink frequency band of the additional user group interferes with the uplink frequency band of the first user group or the downlink frequency band is adjusted when the uplink frequency band of the additional user group interferes with the downlink frequency band of the first user group.

2. The configuration method according to claim 1, wherein the N user groups comprise the first user group and a second user group, and interference exists between a user equipment in the first user group and a user equipment in the second user group, and wherein the method further comprises:
configuring the uplink frequency band of the first user group and a downlink frequency band of the second user group as different frequency bands, and configuring the downlink frequency band of the first user group and an uplink frequency band of the second user group as different frequency bands.

3. The configuration method according to claim 2, wherein the N user groups further comprise a third user group and a fourth user group, and no interference exists between a user equipment in the third user group and a user equipment in the fourth user group, and wherein the method further comprises:
configuring an uplink frequency band of the third user group and a downlink frequency band of the fourth user group as a same frequency band, and configuring a downlink frequency band of the third user group and an uplink frequency band of the fourth user group as a same frequency band.

4. The configuration method according to claim 1, wherein the dividing, by the base station, the user equipments in the first cell into the N user groups comprises:
obtaining, by the base station, geographical location information of the user equipments in the first cell; and
dividing, by the base station, the user equipments in the first cell into the N user groups according to the geographical location information of the user equipments.

5. The configuration method according to claim 4, wherein the dividing, by the base station, the user equipments in the first cell into the N user groups further comprises:
determining a distance between the first user group and the additional user group of the second cell;
comparing the distance to a preset distance; and
when the distance is less than the preset distance, determining that interference exists between a user equipment in the first user group and a user equipment in the additional user group.

6. The configuration method according to claim 1, wherein the dividing, by the base station, the user equipments in the first cell into the N user groups comprises:
dividing, by the base station, the user equipments into the N user groups according to interference information between the user equipments in the first cell, wherein interference exists between at least one user equipment in a third user group and at least one other user equipment in the third user group, and wherein the base station configures an uplink frequency band of the third user group to be different than a downlink frequency band of the third user group.

7. The configuration method according to claim 1, wherein:
when interference exists between at least one user equipment in the first user group and at least one user equipment in a second user group of the N user groups, the base station determines that interference exists between the at least one user equipment in the first user group and the at least one user equipment in the second user group and configures a downlink frequency band and/or an uplink frequency band of the second user group to reduce interference with the first user group; and
when no interference exists between any user equipment in the first user group and any user equipment in the second user group, the base station determines that no interference exists between any user equipment in the first user group and any user equipment in the second user group and configures the downlink frequency band of the second user group to be the same as the downlink frequency band of the first user group and configures the uplink frequency band of the second user group to be the same as the uplink frequency band of the first user group.

8. The configuration method according to claim 1, wherein the method further comprises:
if an uplink frequency band of a second additional user group in the second cell is the same as a downlink frequency band of the first user group, adjusting the downlink frequency band of the first user group, so that the downlink frequency band of the first user group is different from the uplink frequency band of the second additional user group; or
if a downlink frequency band of the second additional user group in the second cell is the same as an uplink frequency band of the first user group, adjusting the uplink frequency band of the first user group, so that the uplink frequency band of the first user group is different from the downlink frequency band of the second additional user group.

9. The configuration method according to claim 1, wherein the configuration information further includes time scheduling information of a second additional user group in the second cell, and the method further comprises:
if an uplink frequency band of the second additional user group is the same as a downlink frequency band of the first user group, adjusting a scheduling time of the first user group to a scheduling time different from a scheduling time of the second additional user group; or
if a downlink frequency band of the second additional user group is the same as an uplink frequency band of the first user group, adjusting a scheduling time of the first user group to a scheduling time different from a scheduling time of the second additional user group.

10. The configuration method according to claim 1, wherein the method further comprises:
sending, by the base station, configuration information of the first cell to a base station of the second cell, wherein the configuration information of the first cell comprises at least an uplink frequency band, a downlink frequency band, and time scheduling information of at least one user group that is in the first cell.

11. A configuration apparatus, comprising:
a processor; and,
a non-transitory computer-readable storage medium coupled to the processor and storing programming instructions for execution by the processor, the programming instructions when executed instruct the processor to:
divide user equipments in a full-duplex system in a first cell into N user groups, wherein N is a positive integer greater than or equal to 2;
configure, for a first user group in the N user groups, an uplink frequency band used for uplink transmission and a downlink frequency band used for downlink receiving, wherein within the first user group, the uplink frequency band is different from the downlink frequency band, and the uplink frequency band and the downlink frequency band are frequency sub-bands of an operating frequency band of the full-duplex system;

obtaining configuration information of a second cell, wherein the configuration information of the second cell comprises at least an uplink frequency band and a downlink frequency band of an additional user group that is in the second cell; and adjusting at least one of the uplink frequency band or the downlink frequency band for the first user group based on the configuration information of the second cell, wherein the uplink frequency band is adjusted when the downlink frequency band of the additional user group interferes with the uplink frequency band of the first user group or the downlink frequency band is adjusted when the uplink frequency band of the additional user group interferes with the downlink frequency band of the first user group.

12. The configuration apparatus according to claim 11, wherein the N user groups comprise the first user group and a second user group, and interference exists between a user equipment in the first user group and a user equipment in the second user group, and the programming instructions further instruct the processor to:

configure the uplink frequency band of the first user group and a downlink frequency band of the second user group as different frequency bands, and configure the downlink frequency band of the first user group and an uplink frequency band of the second user group as different frequency bands.

13. The configuration apparatus according to claim 12, wherein the N user groups further comprise a third user group and a fourth user group, and no interference exists between a user equipment in the third user group and a user equipment in the fourth user group, and the programming instructions further instruct the processor to:

configure an uplink frequency band of the third user group and a downlink frequency band of the fourth user group as a same frequency band, and configure a downlink frequency band of the third user group and an uplink frequency band of the fourth user group as a same frequency band.

14. The configuration apparatus according to claim 11, wherein dividing the user equipments in the first cell into the N user groups comprises:

obtaining geographical location information of the user equipments in the first cell; and dividing the user equipments in the first cell into the N user groups according to the geographical location information of the user equipments.

15. The configuration apparatus according to claim 11, wherein dividing the user equipments in the full-duplex system in the first cell into N user groups further comprises:

determining a distance between the first user group and the additional user group of the second cell;

comparing the distance to a preset distance; and when the distance is less than the preset distance, determining that interference exists between a user equipment in the first user group and a user equipment in the additional user group.

16. The configuration apparatus according to claim 13, wherein dividing the user equipments in the first cell into the N user groups comprises:

dividing the user equipments into the N user groups according to interference information between the user equipments in the first cell, wherein interference exists between at least one user equipment in a third user group and at least one other user equipment in the third user group, and wherein an uplink frequency band of the third user group is configured to be different than a downlink frequency band of the third user group.

17. The configuration apparatus according to claim 11, wherein the instructions further instruct the processor to:

determine whether the first user group comprises at least one user equipment that interferes with at least one user equipment in a second user group of the N user groups, wherein when interference exists between the at least one user equipment in the first user group and the at least one user equipment in the second user group, a downlink frequency band and/or an uplink frequency band of the second user group is configured to reduce interference with the first user group; or wherein when no interference exists between any user equipment in the first user group and any user equipment in the second user group, the downlink frequency band of the second user group is configured to be the same as the downlink frequency band of the first user group or the uplink frequency band of the second user group is configured to be the same as the uplink frequency band of the first user group.

18. The configuration apparatus according to claim 11, wherein the instructions further instruct the processor to:

if an uplink frequency band of a second additional user group in the second cell is the same as a downlink frequency band of the first user group, adjust the downlink frequency band of the first user group, so that the downlink frequency band of the first user group is different from the uplink frequency band of the second additional user group; or if a downlink frequency band of the second additional user group in the second cell is the same as an uplink frequency band of the first user group, adjust the uplink frequency band of the first user group, so that the uplink frequency band of the first user group is different from the downlink frequency band of the second additional user group.

19. The configuration apparatus according to claim 11, wherein the configuration information further includes time scheduling information of a second additional user group in the second cell, and the instructions further instruct the processor to:

if an uplink frequency band of the second additional user group is the same as a downlink frequency band of the first user group, adjust a scheduling time of the first user group to a scheduling time different from a scheduling time of the second additional user group; or if a downlink frequency band of the second additional user group is the same as an uplink frequency band of the first user group, adjust a scheduling time of the first user group to a scheduling time different from a scheduling time of the second additional user group.

20. The configuration apparatus according to claim 11, wherein the instructions further instruct the processor to:

send configuration information of the first cell to a base station of the second cell, wherein the configuration information of the first cell comprises at least an uplink frequency band, a downlink frequency band, and time scheduling information of at least one user group that is in the first cell.

* * * * *